(12) United States Patent
Karmon

(10) Patent No.: US 10,599,324 B2
(45) Date of Patent: Mar. 24, 2020

(54) HAND GESTURE API USING FINITE STATE MACHINE AND GESTURE LANGUAGE DISCRETE VALUES

(71) Applicant: Microsoft Technology Licensing, LLC, Redmond, WA (US)

(72) Inventor: Kfir Karmon, Petach-Tikva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 770 days.

(21) Appl. No.: 14/985,691

(22) Filed: Dec. 31, 2015

(65) Prior Publication Data

US 2017/0192665 A1 Jul. 6, 2017

(51) Int. Cl.
| | |
|---|---|
| G06F 3/0488 | (2013.01) |
| G06K 9/62 | (2006.01) |
| G06F 3/03 | (2006.01) |
| G06F 3/01 | (2006.01) |
| G06K 9/00 | (2006.01) |

(52) U.S. Cl.
CPC .......... *G06F 3/04883* (2013.01); *G06F 3/017* (2013.01); *G06F 3/0304* (2013.01); *G06K 9/00355* (2013.01); *G06K 9/6255* (2013.01)

(58) Field of Classification Search
CPC .. G06F 3/04883; G06F 3/017; G06K 9/00355
See application file for complete search history.

(56) References Cited

U.S. PATENT DOCUMENTS

| | | |
|---|---|---|
| 6,252,598 B1 | 6/2001 | Segen |
| 10,282,563 B2 * | 5/2019 | Anderson ............... G06F 3/013 |
| 2002/0089541 A1 | 7/2002 | Orbanes et al. |
| 2009/0278915 A1 * | 11/2009 | Kramer ................... G06F 3/017 348/48 |
| 2010/0066676 A1 * | 3/2010 | Kramer ................... G06F 3/017 345/158 |

(Continued)

OTHER PUBLICATIONS

International Preliminary Report on Patentability dated Mar. 15, 2018 From the International Preliminary Examining Authority Re. Application No. PCT/US2016/067892. (10 Pages).

(Continued)

*Primary Examiner* — Anil K Bhargava

(57) ABSTRACT

System for associating a computerized hand gestures model with application functions, comprising:
(a) A storage storing a plurality of hand pose features records and hand motion features records. Each of the hand pose features records and hand motion features records is defined by a set of discrete pose values and discrete motion values respectively.
(b) An interface receiving programmer instructions.
(c) A memory storing code.
(d) One or more processors coupled to the interface, storage and memory for executing the code which comprises:
  1) Code instructions to define hand gestures by constructing a unique logical sequence of the hand pose features records and hand motion features records.
  2) Code instructions to associate the unique logical sequence with application functions per the instructions for initiating execution of the functions during the application runtime in response to detection of the unique logical sequence from analysis of images depicting movement of user's hand(s).

20 Claims, 14 Drawing Sheets

(56) References Cited

U.S. PATENT DOCUMENTS

| | | |
|---|---|---|
| 2010/0194762 A1 | 8/2010 | Latta et al. |
| 2010/0281435 A1 | 11/2010 | Bangalore et al. |
| 2011/0234840 A1* | 9/2011 | Klefenz ............. G06K 9/00375 348/222.1 |
| 2012/0036434 A1 | 2/2012 | Oberstein |
| 2012/0324332 A1 | 12/2012 | Zaragoza et al. |
| 2013/0019182 A1 | 1/2013 | Gil et al. |
| 2013/0019206 A1 | 1/2013 | Kotler et al. |
| 2013/0227418 A1 | 8/2013 | Sa et al. |
| 2013/0336524 A1* | 12/2013 | Zhang ................ G06K 9/00355 382/103 |
| 2014/0109023 A1 | 4/2014 | Murillo et al. |
| 2014/0129935 A1 | 5/2014 | Ovadia nahon et al. |
| 2014/0298268 A1 | 10/2014 | Kang et al. |
| 2015/0084859 A1* | 3/2015 | Itzhaik ................... G06F 3/017 345/156 |
| 2015/0140934 A1 | 5/2015 | Abdurrahman et al. |
| 2015/0205364 A1 | 7/2015 | Underkoffler et al. |
| 2016/0162022 A1 | 6/2016 | Seth |
| 2016/0342207 A1* | 11/2016 | Beran ..................... G06F 3/011 |
| 2016/0357519 A1 | 12/2016 | Vargas |
| 2017/0003749 A1 | 1/2017 | Anglin et al. |
| 2017/0168586 A1* | 6/2017 | Sinha ................. G06K 9/00214 |
| 2018/0032144 A1* | 2/2018 | Horowitz ........... G06K 9/00355 |

OTHER PUBLICATIONS

Written Opinion dated Sep. 20, 2017 From the International Preliminary Examining Authority Re. Application No. PCT/US2016/067892. (8 Pages).

International Search Report and the Written Opinion dated Mar. 22, 2017 From the International Searching Authority Re. Application No. PCT/US2016/067892. (14 Pages).

"Non-Final Office Action Issued in U.S. Appl. No. 14/985,775", dated Feb. 28, 2018, 29 Pages.

Martin, John C., "Introduction to Languages and the Theory of Computation", Published by McGraw Hill, Fourth Edition, 2003, 50 Pages.

"International Search Report and Written Opinion Issued in PCT Application No. PCT/US2016/067898", dated Apr. 6, 2017, 15 Pages.

* cited by examiner

HAND GESTURE API USING FINITE STATE MACHINE AND GESTURE LANGUAGE DISCRETE VALUES

RELATED APPLICATIONS

This application is related to co-filed, co-pending and co-assigned U.S. Patent Applications entitled "MULTI-MODAL INTERACTION USING A STATE MACHINE AND HAND GESTURES DISCRETE VALUES" (U.S. application Ser. No. 14/985,716), "RECOGNITION OF HAND POSES BY CLASSIFICATION USING DISCRETE VALUES" (U.S. application Ser. No. 14/985,741), "TRANSFORM LIGHTWEIGHT SKELETON AND USING INVERSE KINEMATICS TO PRODUCE ARTICULATE SKELETON" (U.S. application Ser. No. 14/985,777), "STRUCTURE AND TRAINING FOR IMAGE CLASSIFICATION" (U.S. application Ser. No. 14/985,803), "TRANSLATION OF GESTURE TO GESTURE CODE DESCRIPTION USING DEPTH CAMERA" (U.S. application Ser. No. 14/985,804), "GESTURES VISUAL BUILDER TOOL" (U.S. application Ser. No. 14/985,775), "ELECTRICAL DEVICE FOR HAND GESTURES DETECTION" (U.S. application Ser. No. 14/985,728) and "DETECTION OF HAND GESTURES USING GESTURE LANGUAGE DISCRETE VALUES" (U.S. application Ser. No. 14/985,680), the disclosures of which are incorporated herein by reference.

BACKGROUND

The major technological advances of our times in computerized environment have dramatically increased human machine interaction. Traditional human-machine interfaces (HMI) which usually employ input/output devices, such as keyboards, pointing devices and/or touch interfaces may have served the needs of previous times but as HMI becomes highly intense more natural interfaces are desirable. Such natural interfaces may employ one or more different techniques to provide a simple, straight forward, friendly interface to the user while avoiding the use of mediator hardware elements. Furthermore, two or more natural human-machine user interface (NUI) methods may be combined together to provide comprehensive solution allowing a user to simply and/or directly interact with a computerized device, for example, computer, mobile device, computerized machine and/or computerized appliance. Current implementations of NUI, such as gestures based HMI may be immature thus present major setbacks to a developer who wants to integrate the gesture HMI in an application, such as inaccuracy in gestures recognition and complexity in constructing gestures. In addition current implementations usually involve machine learning and massive computer vision processing requiring extensive processing resources which in turn may lead to high costs and complexity of the application thus preventing the solution from being adopted and becoming wide spread.

SUMMARY

According to some embodiments of the present disclosure, there are provided systems and methods for defining one or more hand gestures for controlling one or more functions of one or more applications by generating a gesture dataset of discrete values. Definition, creation, construction and/or generation of hand gestures, hand poses and/or hand motions as referred to hereinafter throughout this disclosure refers to definition, creation, construction and/or generation of representations of hand gestures, hand poses and hand motions respectively which simulate respective hand gestures, poses and motions of a hand(s). The gesture dataset documents one or more hand poses and/or hand motions wherein each of the one or more hand poses and/or hand motions is defined by a features record of discrete values of one or more hand features (characteristics) such as various finger and/or hand states and/or motions. Continuous values of the one or more hand features may be represented by the discrete values by quantizing the continuous values to support the discrete architecture for generating the hand gesture dataset.

The gesture dataset optionally defines one or more sequences and/or finite state machines (FSM) documenting transitions between hand pose(s) and/or hand motion(s). The gesture dataset may be defined using an application programming interface (API), a textual representation such as for example XML and/or XAML, an analysis of a sequence of images depicting a hand gesture, a code provided by a programmer and/or any human machine interface that allow a user to associate hand gestures with one or more application functions of an application by using, for instance, image sensor(s), movement sensor(s), a graphical user interface (GUI) and/or code or human language. Once associated to hand gestures, the one or more application functions may be initiated by a user at runtime through hand(s) gestures which are captured by an imaging device, processed to identify each of the hand gestures, and launching one or more application functions that are associated with the identified hand gesture(s).

The hand(s) gestures may be operation oriented for simplicity of identification and are constructed from basic discrete pose values and/or discrete motion values which serve as building blocks for a gesture language. By using discrete pose and motion values the gestures construction and/or gestures classification and/or recognition is made simple, relieving the programmer application from machine learning, complex mathematic computation, heuristics, continuous values threshold computing and/or computer vision processing. The programmer may use previously defined hand gestures and/or construct custom hand gestures to be used for triggering one or more application functions. Optionally, the gestures API is combined with other means of HMI and/or NMI to support a multimodal human-machine interaction which takes advantage of two or more HMI and/or NMI interfaces to provide the user with a comprehensive environment.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
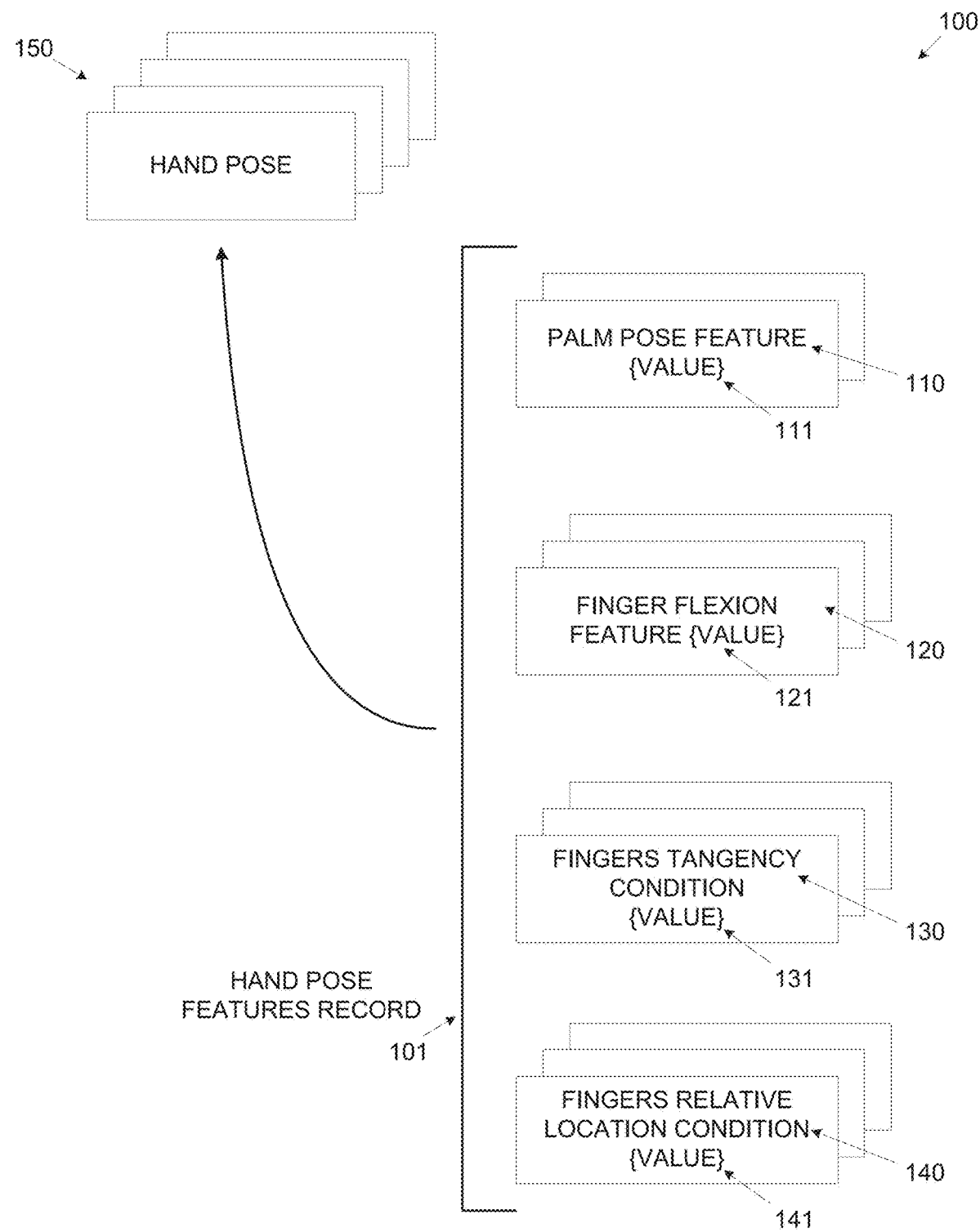
FIG. 1 is a schematic illustration of exemplary hand poses construction, according to some embodiments of the present disclosure.

According to some embodiments of the present disclosure, there are provided systems and methods for creating and providing a hands (hands) gestures API allowing a programmer to map hand(s) gestures to software application functions. The hand(s) gestures are constructed using a gesture dataset which defines a plurality of discrete hand pose values and discrete motion values each representing a specific feature (characteristic) of a hand(s) pose and/or motion respectively. Each of the hand poses and/or hand motions is represented by a features record, for example, a features vector, a features matrix and/or a features table. The hand pose features may include, for example, a hand selection (left, right, both and/or any), a palm rotation, a palm direction, a finger direction (per finger), a finger flexion (per finger), a finger tangency (per two or more fingers) and/or a finger relative location (per two or more fingers).

The hand motion features may include for example, motion properties such as, for example, size, speed, range and/or location in space and/or motion script(s) which define the motion shape. The motion script may be defined as a curve in the format of, for example, scalable vector graphics (SVG) and/or a string constructed of one or more predefined discrete micro-movements which define micro-movements in each of the three two-dimension (2D) planes. Continuous values of the one or more hand pose features and/or hand motion features may be represented by the discrete pose values and discrete motion values respectively by quantizing the continuous values to support the discrete architecture for generating the hand gesture dataset. Each of the one or more hand gestures may be represented by a unique logic sequence of one or more of the hand poses and/or hand motions, for example by a unique FSM. The hand gestures may be operation oriented to simplify their construction, classification and/or identification. By focusing on operation oriented hand gestures may reduce the need for excessive hand modeling, gesture identification and/or gesture classification since the modeling, identification and/or classification may focus on operation oriented hand gestures and avoid other hand movements and/or gestures.

Optionally intuitive hand gestures that may allow a fast learning curve by the user using a gesture NMI are defined in advance and inputted into a gesture API, a gesture library and/or code instructions to allow a programmer to combine a number of intuitive hand gestures into a new hand gesture for initiating one or more application functions of an application in runtime. The intuitive nature of the hand gestures may also serve for simple recognition and/or classification of the hand gestures in the same fashion as the operation oriented nature of the hand gestures does. Such a gesture API may expose a gesture set, for example a gestures library, comprising a plurality of hand gesture though a software interface allowing the programmer to associate the one or more application functions to one or more of the hand(s) gestures.

The programmer's application may be executed on one or more computerized devices, for example, computer, mobile device, computerized machine and/or computerized appliance equipped and/or attached to an imaging device which monitors the user's hand(s) movement. The captured user's hand(s) movement is processed to identify the one or more hand(s) gestures. Once the one or more hand(s) gestures are identified, a trigger is initiated to launch the one or more associated application function. The programmer may use one or more previously defined hand gestures available in the gesture set. A hand gesture may refer to one or more hand poses and/or hand motions performed by a single hand and/or of both hands (right and left). Each hand is assigned a dedicated instance of the dataset of poses and/or motions features so that the one or more hand gestures of each hand may be separately constructed, classified and/or identified. However for brevity, reference hereinafter is made to hand gesture to address hand gestures of one and/or both hands. Optionally, the API allows the programmer to construct one or more custom hand(s) gestures to be used within his application. The one or more custom hand(s) gestures are created using one or more of the plurality of discrete pose values and/or discrete motion values.

At runtime while processing the user's hand movement, one or more hand gestures are classified and/or identified by employing one or more image analysis processes to identify and/or classify the hand gestures each defined by the unique logic sequence for example the FSM. The one or more image analysis may include, for example, discriminative fern ensemble (DFE) and/or discriminative tree ensemble (DTE). At identification and/or classification of the one or more hand gestures a trigger is set to the associated one or more application functions.

Optionally, every transition in the hand gesture sequence, such as the FSM, triggers an event which may be used by, for example, a system and/or an operating system (OS). The hand gestures construction, recognition, identification and/or classification as described in some embodiments of present application enable the programmer to define an NMI with high expressiveness while maintaining simplicity. The hand gesture construction, recognition, identification and/or classification do not require processor intensive platform(s) thus dramatically reducing computation costs. The programmer's application may not employ computer learning and/or computer vision processing in the process of associating the hand gestures with the application functions as these actions are done by the gesture library, a gesture module and/or a gesture API. Furthermore, this approach allows the programmer great flexibility in designing the application and the hand(s) gestures to be used within the application. Moreover, as each application may consist of limited number hand gestures, each represented with a unique FSM, for example 10, 50, 100 and/or any intermediate number of hand gestures, a statistical identification of a hand gesture may be limited to a small number of possibilities thus reducing the computational complexity of computer vision processing and/or computer learning involved in the runtime recognition, identification and/or classification of the hand gestures.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Referring now to the drawings, FIG. 1 is a schematic illustration of exemplary hand poses construction, according to some embodiments of the present disclosure. Illustration 100 depicts exemplary hand poses 150 representations construction as hand pose features records 101 which include one or more hand pose features 110, 120, 130 and 140. Each of the hand pose features may be assigned with one or more discrete pose value 111, 121, 131 and/or 141 which identify the state (value) of the respective hand pose feature 110, 120, 130 and/or 140 for an associated hand pose of the hand poses 150.

The combination of the one or more discrete pose values 111, 121, 131 and/or 141 of the respective hand pose features 110, 120, 130 and 140 as defined by the hand pose features record 101 identifies a specific pose of the hand poses 150 which may later be identified, recognized and/or classified by monitoring the movement of a user's hands. Continuous values of the one or more hand pose features 110, 120, 130 and/or 140 may be represented by the discrete pose values 111, 121, 131 and/or 141 by quantizing the continuous values. The hand pose features record 101 may be represented as, for example, a features vector, a features matrix and/or a features table. The hand pose features record 101 may include values of one or more of the following hand pose features:

Palm pose features—one or more palm pose features 110 include, for example, hand selection, palm direction, palm rotation and/or hand location. Hand selection may identify which hand is active and may include discrete pose values 111 such as, for example, right, left, both and/or any. Palm direction may define the direction in which the palm of the active hand is facing and may include discrete pose values 111 such as, for example, left, right, up, down, forward and/or backward. Palm rotation may define the rotation state of the palm of the active hand and may include discrete pose values 111 such as, for example, left, right, up, down, forward and/or backward. Hand location may identify the spatial location of the active hand in space and may include discrete pose values 111 such as, center of field of view (FOV), right side of FOV, left side of FOV, top of FOV, bottom of FOV, front of FOV and/or rear of FOV. Where FOV is for example, the visible space of an imaging device monitoring the movement of the user's hand. Optionally, hand location is identified with respect to a fixed object present in the FOV, for example, keyboard and/or pointing device so that hand location may be defined by discrete pose values 111 such as, for example, above_keyboard, behind_keyboard, right_of_keyboard and/or left_of_keyboard.

Finger flexion features—one or more finger flexion features 120 which are defined per finger. For example, a finger flexion feature 120 may be a flexion and/or curve state which may include discrete pose values 121 such as, for example stretched, folded and/or open represented, for example by 0, 1, and 2. Each finger (thumb, index, middle, ring and/or pinky) is assigned one or more specific finger features, for example, {thumb, middle, ring, pinky} in {folded} state and {index} in { stretched} state.

Finger tangency condition features—one or more fingers tangency features 130 which are defined per finger. The tangency feature may define a touch condition of any two or more fingers and/or touch type and may include discrete pose values 131 such as, for example, not touching, fingertip and/or full touch.

Finger relative location condition features—one or more fingers relative location features 140 are defined per finger. Each of the finger relative location condition features 140 may define a relative location of one finger in relation to another. The fingers relative location features 140 may include discrete pose values 141 such as, for example, one or more fingers are located relatively to another one or more fingers to the left, right, above, below, inward, outward, in front and/or behind.

Each one of the hand poses 150 is defined by a unique one of the hand pose features records 101 which may be a combination and/or sequence of one or more discrete pose values 111, 121, 131 and/or 141 each providing a value of the corresponding hand pose feature 110, 120, 130 and/or 140. The hand pose features records 101 may include only some (and not all) of the discrete pose values 111, 121, 131 and/or 141 while other discrete pose values 111, 121, 131 and/or 141 which are not included are left free. For example, the hand pose features records 101 may define a specific state of the fingers (for example discrete pose values 121, 131 and/or 141) while the direction of the palm is left unspecified (for example discrete pose value 111). In this case the hand pose 150 is identified, recognized and/or classified in runtime at the detection of the fingers state as defined by the hand pose features records 101 with the hand facing any direction. Using the discrete pose values 111, 121, 131 and/or 141 allows for simple creation of a hand pose 150 as there are a finite number of discrete pose values 111, 121, 131 and/or 141 with which the hand pose 150 may be created. For instance, the palm rotation feature included in the hand pose feature 110 may include up to six discrete pose values 111—left, right, up, down, forward and backward. Recognition, identification and/or classification of the one or more hand poses 150 is also simplified since the discrete pose values 111, 121, 131 and/or 141 are easily identified because there is no need for hand skeleton modeling thus reducing the level of computer vision processing.

Furthermore use of computer learning is completely avoided by the application of a programmer as the one or more hand poses 150 are identified, recognized and/or classified in runtime using a gesture library and/or a gesture API which may be trained in advance. Training of the gesture library and/or gesture API may be greatly simplified thus reducing the processing load due to the discrete construction of the hand poses 150 which allows for a finite, limited number of possible states for each of the hand pose features 110, 120, 130 and/or 140. The discrete representation of the hand pose features 110, 120, 130 and/or 140 may not be limited to discrete values only. Continuous values of the one or more hand features 110, 120, 130 and/or 140 may be represented by discrete pose values 111, 121, 131 and/or 141 respectively by quantizing the continuous values. For example, the palm rotation palm pose feature may be defined with 8 discrete pose values 111—0°, 45°, 90°, 135°, 180°, 225°, 270° and 315° to quantize the complete rotation range of 0°-360°.

Figure 2:
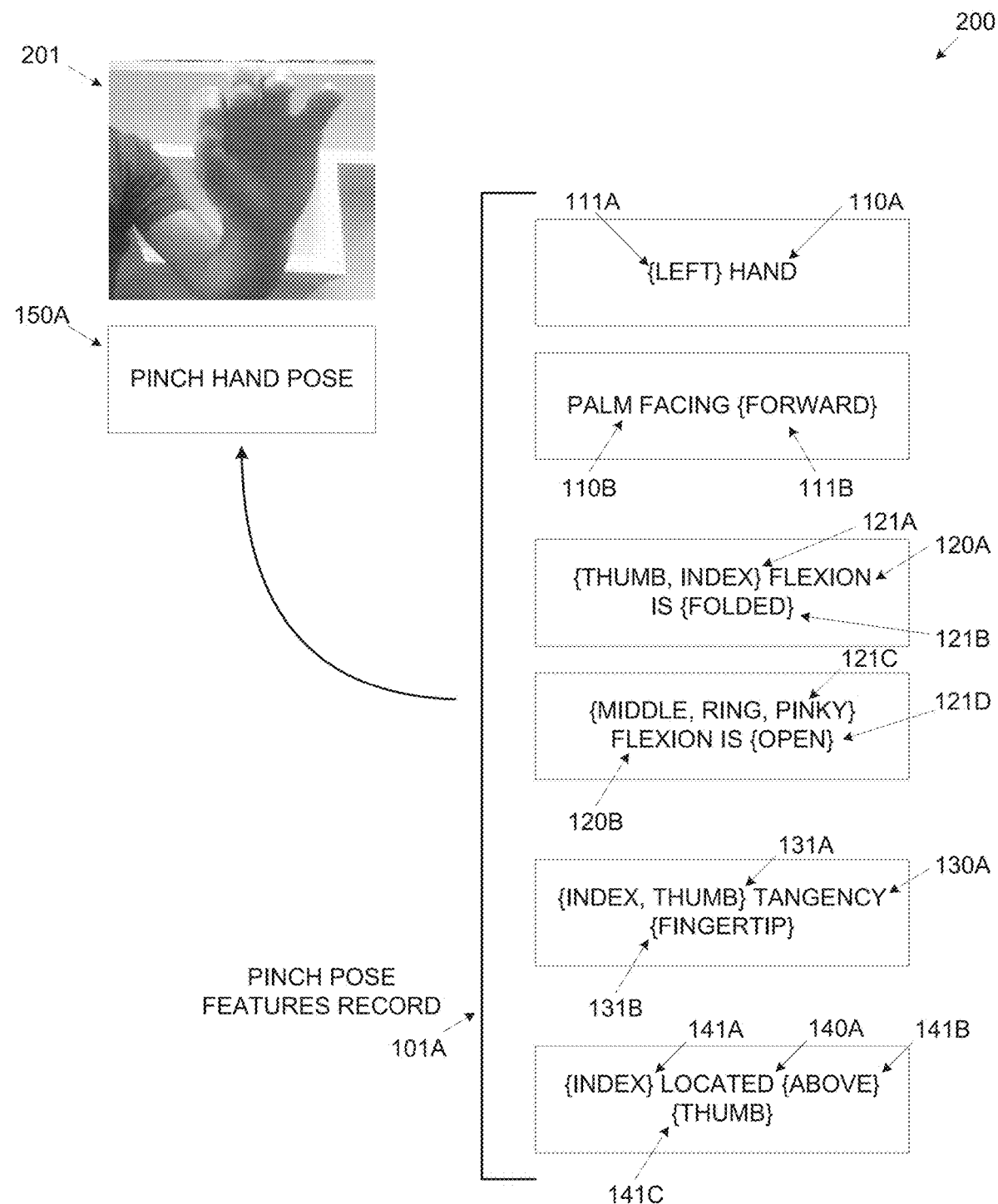
FIG. 2 is a schematic illustration of an exemplary pinch hand pose construction, according to some embodiments of the present disclosure.

Reference is now made to FIG. 2 which is a schematic illustration of an exemplary pinch hand pose construction, according to some embodiments of the present disclosure. Illustration 200 depicts an exemplary pinch hand pose 150A construction by a pinch pose features record 101A comprising discrete pose values such as the discrete pose values 111, 121, 131 and/or 141, each indicating a value of a corresponding hand pose feature such as the hand pose features 110, 120, 130 and/or 140. The pinch hand pose 150A which is visualized through an image capture 201 is created with some of the plurality of discrete pose values 111, 121, 131 and 141 as follows:

A hand selection feature 110A is assigned a discrete pose value 111A to indicate the left hand is active.

A palm direction feature 110B is assigned a discrete pose value 111B to indicate the palm of the active hand is facing forward.

A fingers flexion feature 120A is assigned a discrete pose value 121A and a discrete flexion value 121B to indicate the thumb and index fingers are folded.

A fingers flexion feature 120B is assigned a discrete pose value 321C and a discrete pose value 121D to indicate the middle, ring and pinky fingers are open.

A fingers tangency condition feature 130A is assigned a discrete pose value 331A to indicate the thumb and index fingers are touching at their tips.

A fingers relative location feature 140A is assigned a discrete pose value 141A, a discrete pose value 141B and a discrete pose value 141C to indicate the index finger is located above the thumb finger.

Figure 3:
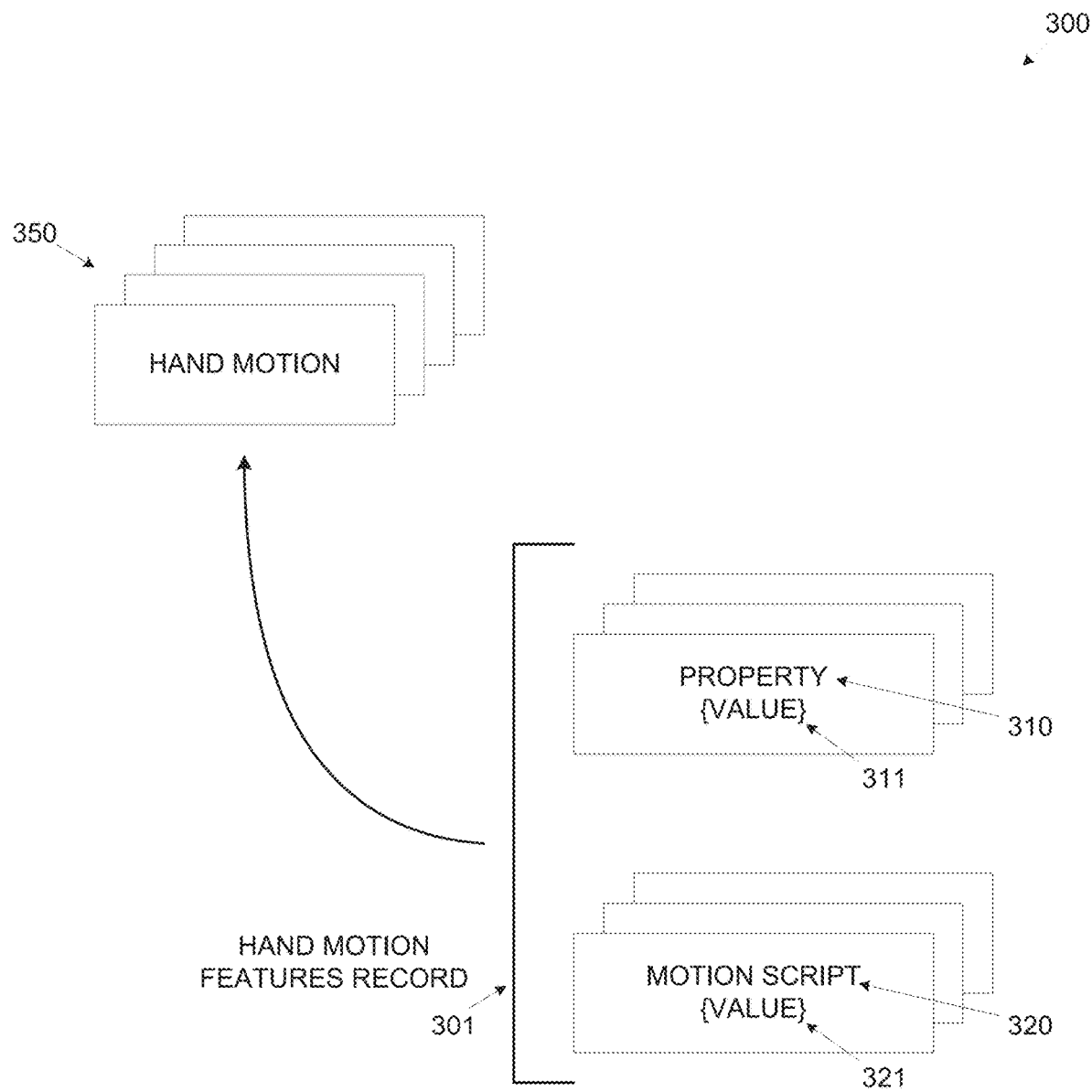
FIG. 3 is a schematic illustration of exemplary hand motions construction, according to some embodiments of the present disclosure.

As seen above, the pinch hand pose 150A is uniquely defined by a pinch pose features record 101A comprising the discrete pose values 111A, 111B, 121A, 121B, 121C, 121D, 131A, 131B, 141A, 141B and 141C corresponding to the hand pose features 110A, 110B, 120A, 120B, 130A and 140A respectively. Similarly additional hand poses may be created using the API and associated with the one or more application functions as indicated by the programmer Reference is now made to FIG. 3 which is a schematic illustration of exemplary hand motions construction, according to some embodiments of the present disclosure. Illustration 300 depicts exemplary hand motions 350 representations construction as hand motion features records 301 which include one or more hand motion features 310 and 320. Each of the hand motion features 310 and 320 may be assigned with one or more discrete motion values 311 and/or 321 which identify the state (value) of the respective hand motion feature 310 and/or 320 for an associated hand motion of the hand motions 350. The hand motion features record 301 identifies a specific motion of a hand and/or finger(s) which may later be identified, recognized and/or classified by monitoring the movement of the user's hands. Continuous values of the one or more hand motion features 310 and/or 320 may be represented by the discrete motion values 311 and/or 321 by quantizing the continuous values. The hand motion features record 301 may be represented as, for example, a features vector, a features matrix and/or a features table. The hand motion features record 301 may include one or more of the following hand motion features:

Motion property features—one or more motion property features 310 may include, for example, motion size, motion speed and/or motion location. Motion size may identify the size (scope) of the motion, and may include discrete motion values 311 such as, for example, small, normal and/or large. Motion speed may define the speed of the motion and may include discrete motion values 311 such as, for example, slow, normal, fast and/or abrupt. Motion location may identify the spatial location in which the motion is performed, and may include discrete motion values 311 such as, for example, center of FOV, right side of FOV, left side of FOV, top of FOV, bottom of FOV, front of FOV and/or rear of FOV. Optionally, hand location is identified with respect to a fixed object present in the FOV, for example, keyboard and/or pointing device so that hand location may include discrete motion values 311 such as, for example, above_keyboard, behind_keyboard, right_of_keyboard and/or left_of_keyboard.

Motion script features—one or more motion script features 320 may define the actual motion performed. The motion script values 320 may include, for example, motion direction, motion start point, motion end point and/or pre-defined curve shapes. The motion direction feature 320 may include discreet motion values 321 such as, for example, upward, downward, left_to_right, right_to_left, diagonal_left_upward, diagonal_right_upward, diagonal_left_downward, diagonal_right_downward, clockwise_arc_right_upward, clockwise_arc_right_downward, clockwise_arc_left_upward, clockwise_arc_left_downward, counter_clockwise_arc_right_upward, counter_clockwise_arc_right_downward, counter_clockwise_arc_left_upward and/or counter_clockwise_arc_left_downward. The motion curve shapes may include for example, at-sign (@), infinity sign (∞), digit signs, alphabet signs and the likes. Optionally, additional one or more curve shapes may be created as pre-defined curves, for example, checkmark, bill request and the likes as it is desirable to assign application functions a hand gesture which is intuitive and is publically known, for example, at-sign for composing and/or sending an email, checkmark sign for a check operation and/or a scribble for asking for a bill. The one or more curve shapes may optionally be created using a freehand tool in the format of, for example, SVG. Each of the motion script features 320 is defined for a 2D plane, however each of the motion script features 320 may be transposed to depict another 2D plane, for example, X-Y, X-Z and/or Y-Z. Optionally, the motion script features 320 define three dimensional (3D) motions and/or curves using a 3D image data representation format.

Each one of the hand motions 350 is defined by a unique one of the hand motion features records 301 which may a combination and/or sequence of one or more discrete motion values 311 and/or 321 each providing a value of the corresponding hand motion feature 310 and/or 320. Using the discrete motion values 321 and/or 321 allows for simple creation of the hand motions 350 as there are a finite number of discrete motion values 311 and/or 321 with which the hand motion 350 may be created. For instance the motion speed feature included in the hand motion property feature 310 may include up to four discrete motion values 311—slow, normal, fast and abrupt.

Recognition, identification and/or classification of the one or more hand motions 350 is also simplified since the discrete motion values 311 and/or 321 are easily identified because there is no need for hand skeleton modeling thus reducing the level of computer vision processing. The discrete representation of the hand motion features 310 and/or 320 may not be limited to discrete values only, continuous values of the one or more hand motion features 310 and/or 320 may be represented by discrete motion values 311 and/or 321 respectively by quantizing the continuous values. For example, the motion speed motion property feature may be defined with 6 discrete motion values 311—5 m/s (meter/second), 10 m/s, 15 m/s, 20 m/s, 25 m/s and 30 m/s to quantize the motion speed of a normal human hand of 0 m/s-30 m/s. Furthermore computer learning is completely avoided as the one or more hand motions 150 are not learned in advance but rather identified in real time which is made possible due to their discrete construction.

Figure 4:
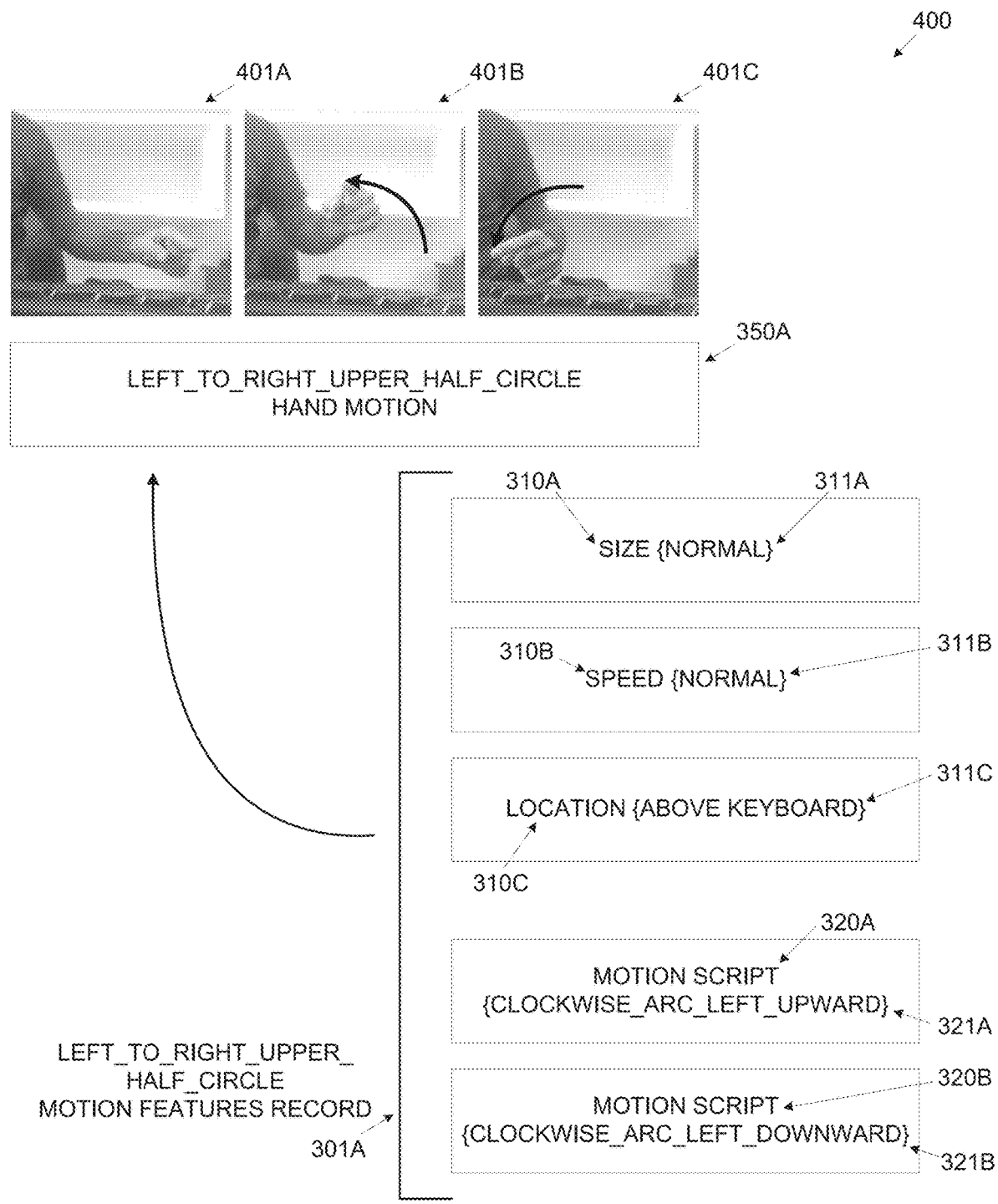
FIG. 4 is a schematic illustration of an exemplary half circle hand motion construction, according to some embodiments of the present disclosure.

Reference is now made to FIG. 4 which is a schematic illustration of an exemplary half circle hand motion construction, according to some embodiments of the present disclosure. Illustration 400 depicts an exemplary left_to_right_upper_half_circle hand motion 350A construction by a left_to_right_upper_half_circle hand motion features record 301A comprising discrete motion values such as the discrete motion values 311 and/or 321, each indicating a corresponding hand motion feature such as the hand motion features 310 and/or 320. The left_to_right_upper_half_circle hand motion 350A which is visualized through image captures 401A, 401B and 401C is created with some of the plurality of discrete motion values 311 and 321 as follows:

A motion size feature 310A is assigned a discrete motion value 311A to indicate the motion size is normal.

A motion speed feature 310B is assigned a discrete motion value 311B to indicate the motion speed is normal.

A motion location feature 310C is assigned a discrete motion value 311C to indicate the motion is performed above a keyboard.

A first motion script feature 320A is assigned a discrete motion value 321A to indicate a motion shape of clockwise_arc_left_upward as presented by the image capture 401B.

A second motion script feature 320B is assigned a discrete motion value 321B to indicate a motion shape of clockwise_arc_left_downward as presented by the image capture 401C.

Figure 5:
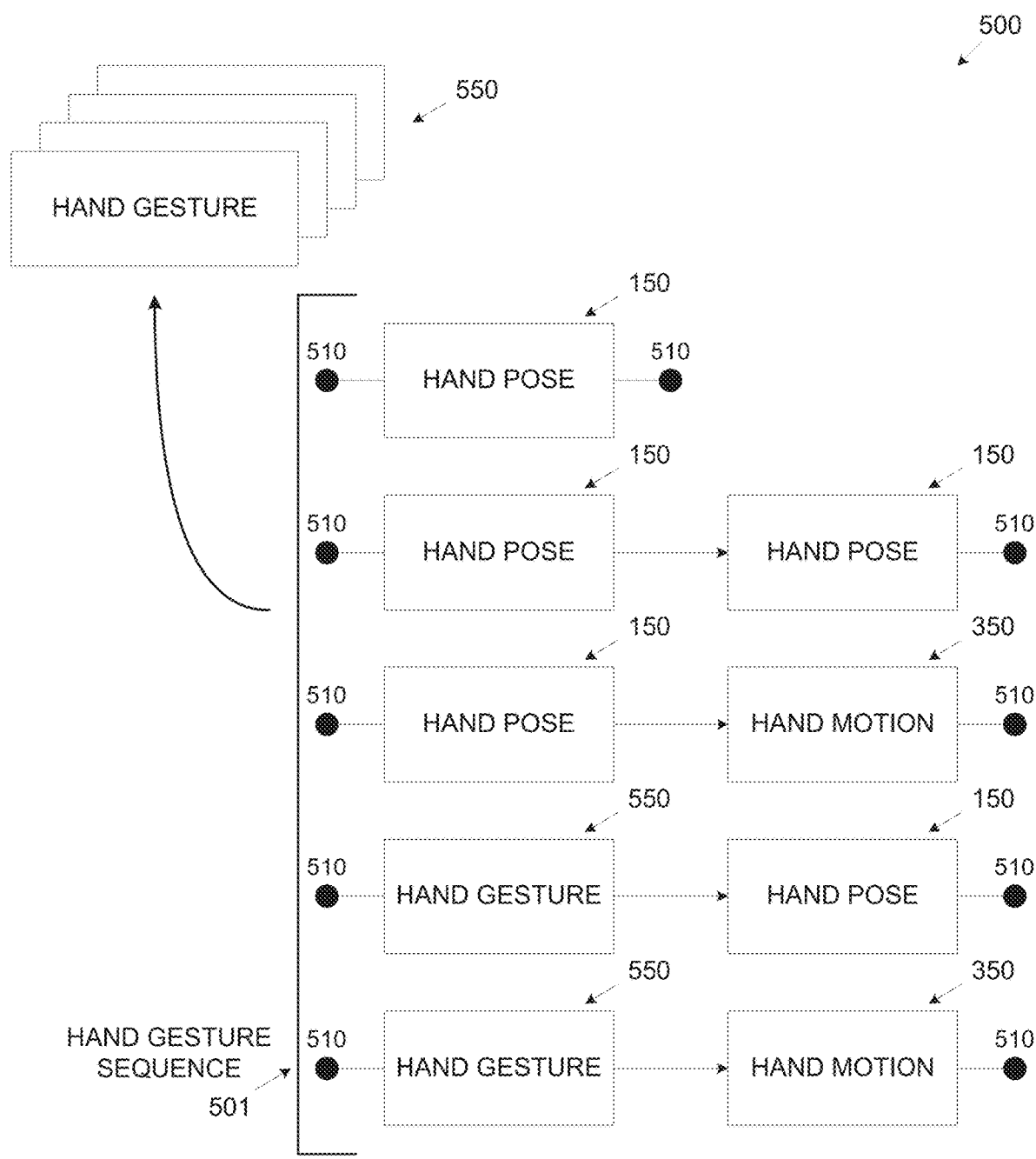
FIG. 5 is a block diagram of the building blocks of exemplary hand gestures, according to some embodiments of the present disclosure.

As seen above, the left_to_right_upper_half_circle hand motion 350A is uniquely defined by a left_to_right_upper_half_circle hand motion features record 301A comprising of the discrete motion values 311A, 311B, 311C, 321A and 321B corresponding to the hand motion features 310A, 310B, 310C, 320A and 320B respectively. Similarly additional hand and/or finger(s) motion may be created using the API and associated with the one or more application functions as indicated by the programmer Reference is now made to FIG. 5 which is a block diagram of the building blocks of an exemplary hand gesture, according to some embodiments of the present disclosure. Illustration 500 depicts several construction schemes of exemplary hand gestures (representations) 550. The hand gestures 550 may be created through one or more possible constructions, for example:

(a) The hand gesture 550 may consist of a hand pose, such as the hand pose 150.

(b) The hand gesture 550 may be a combination and/or sequence of two hand poses 150.

(c) The hand gesture 550 may be a combination and/or sequence of the hand pose 150 and a hand motion, such as the hand motion 350.

(d) The (first) hand gesture 550 may be a combination and/or sequence of a second hand gesture 550 and one of the hand poses 150. The second hand gesture 550 may be the same one as the first hand gesture 550 or a different one of the hand gestures 550.

(e) The (first) hand gesture 550 may be a combination and/or sequence of a second hand gesture 550 and one of the hand motions 350. The second hand gesture 550 may be the same one as the first hand gesture 550 or a different one of the hand gestures 550.

The hand gesture 550 may be created through multiple iterations of the constructions (d) and/or (e) above. Each hand gesture 550 is constructed as a unique combination and/or sequence represented by a hand gesture sequence 501 which comprises of the one or more of: hand poses 150, hand motions 350 and/or hand gestures 550. Each of the hand gestures 550 starts and ends with an idle state 510 which is a virtual state identifying the start and/or the end of the unique hand gesture sequence 501 of the hand gesture 550.

Figure 6:
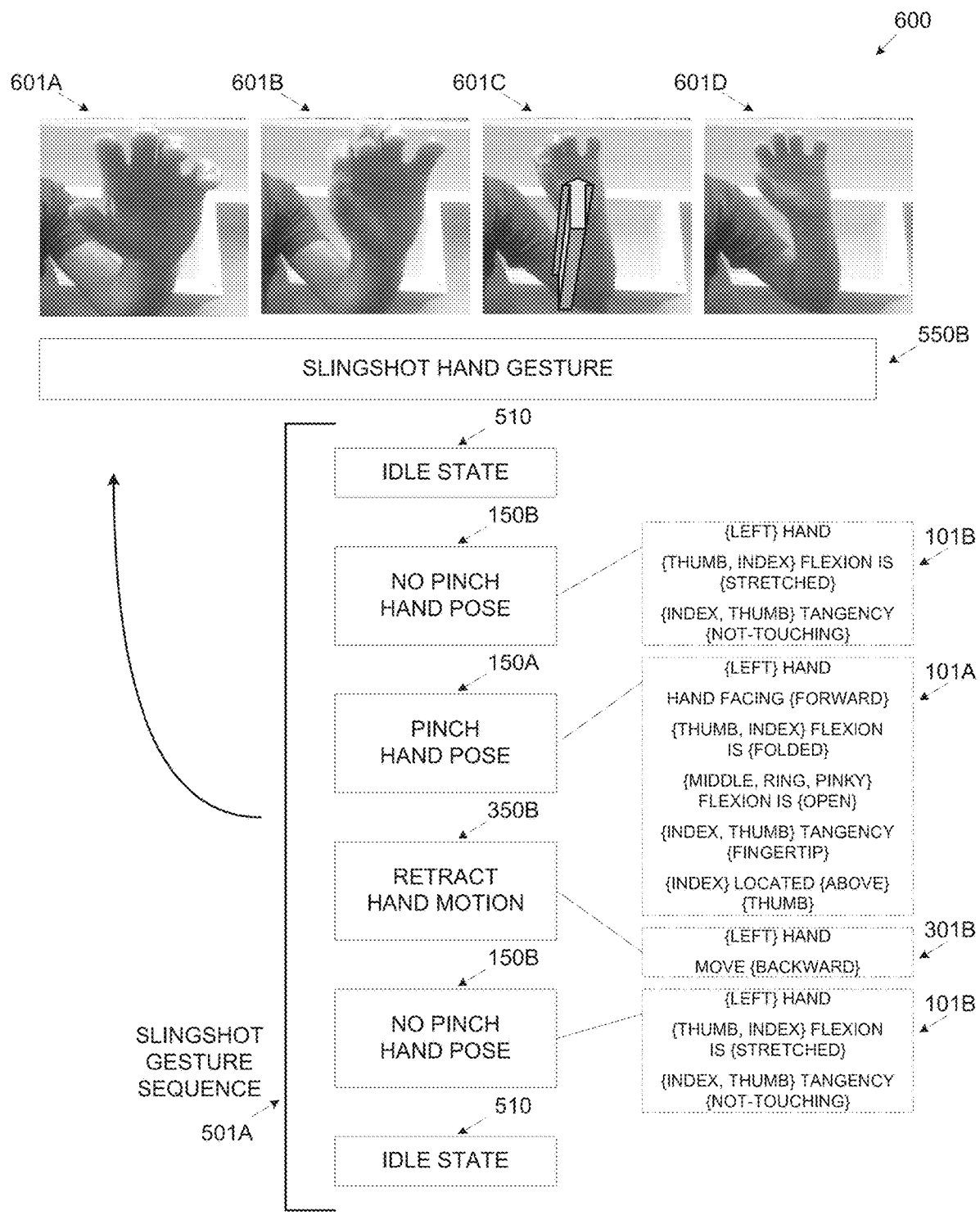
FIG. 6 is a block diagram of the building blocks of an exemplary slingshot hand gesture, according to some embodiments of the present disclosure.

Reference is now made to FIG. 6 which is a block diagram of the building blocks of an exemplary slingshot hand gesture, according to some embodiments of the present disclosure. Illustration 600 depicts an exemplary slingshot hand gesture 550A construction from multiple hand poses such as the hand pose 150 and hand motions such as the hand motion 350. The slingshot hand gesture 550A which is visualized through image captures 601A, 601B, 601C and 601D is constructed of a combination and/or sequence of an idle state such as the virtual idle state 510, a no pinch hand pose 150B, a pinch hand pose such as the pinch hand pose 150A, a retract hand motion 350B and another idle state such as the virtual idle state. The sequence of the slingshot hand gesture 550A is as follows:

A virtual idle state 510 defines the starting state and/or point of the sequence of the slingshot hand gesture 550A.

A no pinch hand pose 150B defined by a hand pose features record 101B represents no pinching action as depicted in image capture 601A.

A pinch hand pose 150A defined by the hand pose features record 101A in which a pinch action is identified as depicted in image capture 601B.

A retract hand motion 350A defined by a hand motion features record 301B in which the hand is moved backwards as is depicted in image capture 601C.

A no pinch hand pose 150B defined by the hand pose features record 101B represents the pinch pose is released and identified as no pinching action as depicted in image capture 601D.

A virtual idle state 510 defines the end state and/or point of the sequence of the slingshot hand gesture 550A.

The sequence of the slingshot hand gesture 550A as described above is represented through a unique slingshot hand gesture sequence 501A which is associated with the slingshot hand gesture. For any of the hand poses 150 and/or hand motions 350 only relevant discrete pose and/or motion values may be defined, as is evident, for example, the no pinch hand pose features record 101B in which the hand selection discrete pose value 111 (left), the finger flexion discrete pose value 121 (stretched) and the finger tangency discrete pose value 131 (not touching) are defined for the idle pose 150B. Other discrete pose values which are irrelevant to distinguishing between the no pinch hand pose 150B from the pinch hand pose 150A are left free and are not specified. Specifying only the relevant discrete pose and/or motion values allows for several degrees of freedom in the articulation of the hand poses 150 and/or hand motions 350 as performed by different one or more users at runtime. This means each of the one or more users may perform the hand pose 150 and/or hand motion 350 slightly differently and yet they are still recognized, identified and/or classified the same.

The programmer may associate the one or more application functions to the one or more hand gestures such as the hand gestures 550 using the gestures library through the pre-defined gestures API. The hand gestures 550 may be pre-defined and available in the gesture library and/or in a separate library. Optionally, the programmer may create custom hand gestures 550 using one or more of the discrete pose values and/or discrete motion values as described in the construction illustration 550. Furthermore, the programmer may create one or more custom hand poses such as the hand pose 150 and/or hand motions such as the hand motions 350.

The unique combination and/or sequence of each hand gesture 550 may be represented by a unique FSM, i.e. the FSM includes one or more of the hand poses 150 and/or the hand motions 350 to represent the hand gesture 550. Optionally, any transition in the FSM may trigger an event which may be logged and used for one or more of a plurality of uses, for example, use of the respective application (the application which includes the associated one or more application functions), use of other one or more applications and/or use of the OS controlling the execution environment.

Figure 7:
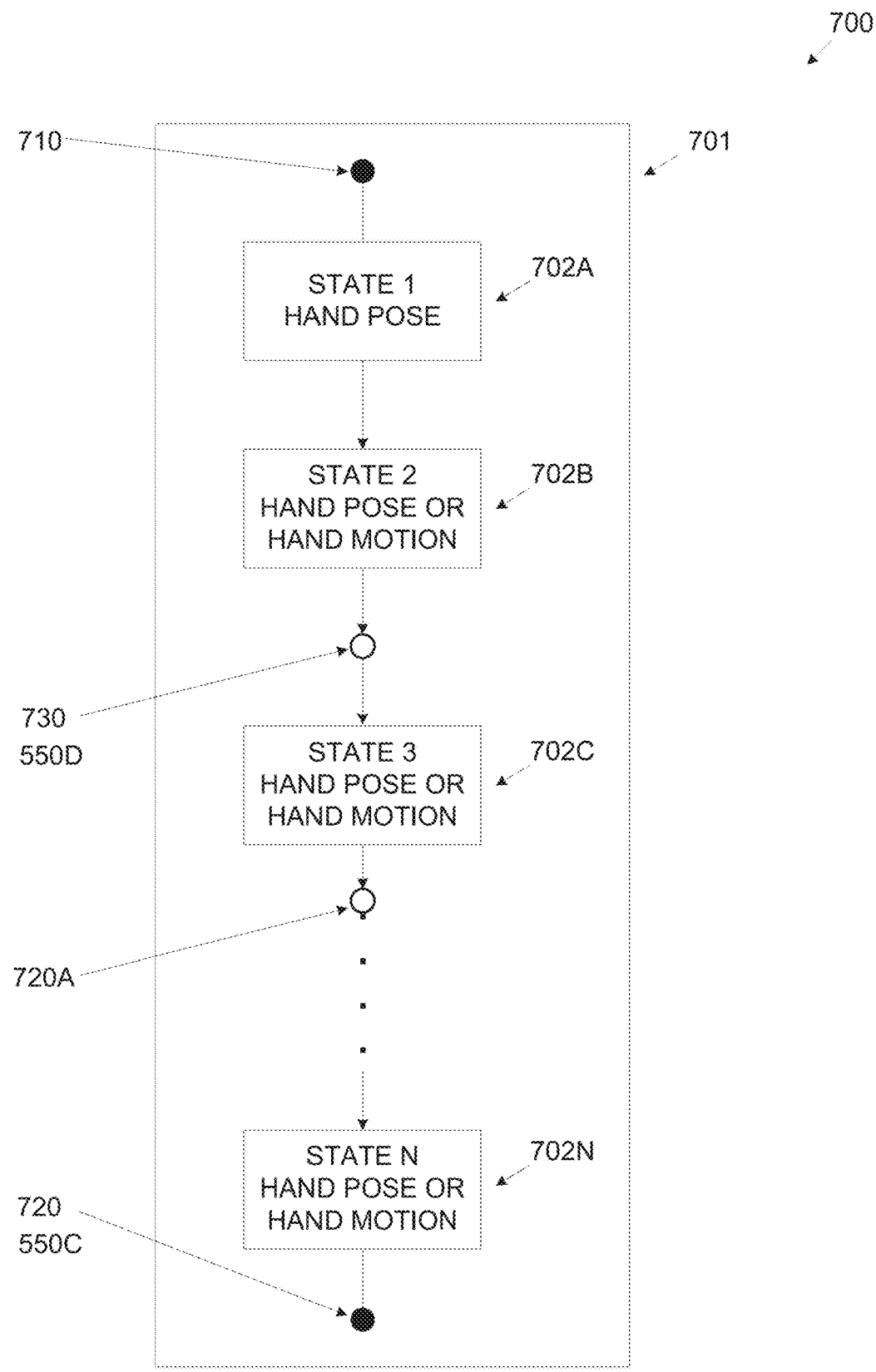
FIG. 7 is a schematic illustration of an exemplary finite state machine defining hand gestures by a sequence of hand motions and hand poses, according to some embodiments of the present disclosure.

Reference is now made to FIG. 7 which is a schematic illustration of finite state machine (FSM) defining hand gestures by a sequence of hand motions and hand poses, according to some embodiments of the present disclosure. An illustration 700 depicts an FSM 701 which may represent a hand gesture sequence such as the hand gesture sequence 501. The FSM 701 starts with a start point 710 which may be a virtual state indicating an idle state of the FSM 701 and may include one or more states 702A, 702B, 702C through 702N. The first state 702A is a hand pose which is a start of a sequence representing a hand gesture such as the hand gesture 550. Each of the succeeding states 702B, 702C through 702N may be either a hand pose such as the hand poses 150 or a hand motion such as the hand motions 350. The FSM 701 is ended with an FSM end point such as the end point 510. When associating one or more of the hand gestures 550 with one or more of the application functions, the associated application function may trigger and/or launched (executed) at the detection of the corresponding FSM 701 as identified at an end point 720 indicating a hand gesture 550D of the plurality of hand gestures 550. The start point 710 and/or the end point 720 may be defined by a virtual idle state such as the idle state 510. Optionally, one or more actions and/or application functions may be triggered at the detection of a subset of the FSM 701, such as for example at point 730 which indicates another hand gesture 550D which is a partial sequence of the hand gesture 550C.

Optionally, while monitoring the hand movement of the user during runtime, one or more points along the sequence of the FSM 701 may be defined by the programmer, for example, intermediate point 720A, for logging user interaction for one or more uses, for example, future use, use of the respective application (the application which includes the associated one or more application functions), use of other one or more applications and/or use of the operating system controlling the execution environment. Optionally, the FSM 701 may be constructed to represent a complex hand gestures such as the hand gestures 550 by including repetitions of one or more of the states 702A-702N, splitting to several parallel and/or sequential paths and or combining two or more FSMs 701 and/or parts thereof. Implementing the FSM 701 for the hand gesture sequences 501 allows the programmer high flexibility and ease of use in associating the one or more application functions with one or more of the hand gestures 550. The FSM 701 may represent a specific one of the hand gestures 550, one or more subsets of the FSM 701 may represent different one or more hand gestures 550 and/or a combination of one or more of the FSM 701 states may represent yet another one or more hand gestures 550.

The subsets, combinations and or alternative FSM 701 sequences may be associated with different one or more application functions (and/or actions) and/or associated with the same one or more application functions as desired by the programmer Optionally, one or more alternative FSM 701 may be associated with one of the application functions and/or actions. Optionally, every transition in the FSM 701 triggers an event which may be used by a system and/or an OS for one or more of a plurality of uses, for example, logging user movements, sharing gesture information with other applications, initiating one or more actions, system calls and/or application(s) functions.

Using the FSM 701 to represent each of the plurality of hand gesture sequences 501 each correlating to one of the hand gestures 550, significantly simplifies the analysis process for recognizing, identifying and/or classifying the one or more hand gestures 550 during the runtime execution of the application in order to trigger the one or more application function associated with the one or more hand gestures 550. Recognition, identification and/or classification are simplified since FSM 701 includes a finite number of states each constructed of a hand pose features record and/or hand motion features records such as the hand pose features record 101 and hand motion features record 301 respectively that may be easily identified because there is no need for intensive hand skeleton modeling thus reducing the level of computer vision processing. Furthermore use of computer learning and/or hand skeleton modeling (using 3D vector processing) is completely avoided the programmer's application as it is done by a gesture library and/or gesture API which may provide the gesture identification, recognition and/or classification services, providing the application with an end product, i.e. the hand gesture 550.

Figure 8:
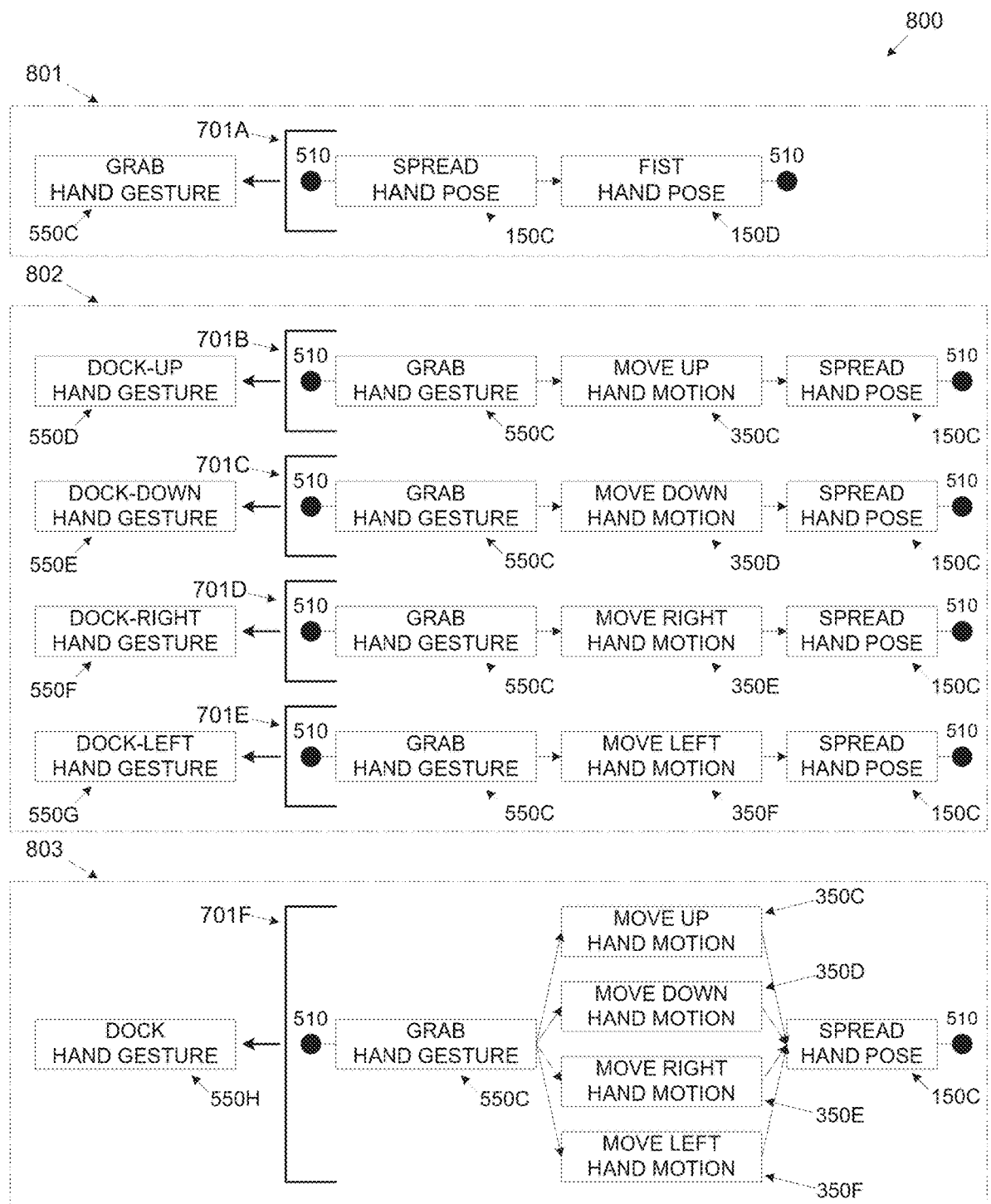
FIG. 8 is a schematic illustration of an exemplary implementation of an exemplary dock hand gesture using an FSM, according to some embodiments of the present disclosure.

Reference is now made to FIG. 8 which is a schematic illustration of an exemplary implementation of an exemplary dock hand gesture using an FSM, according to some embodiments of the present disclosure. An illustration 800 depicts 3 dock hand gesture association scenarios where an FSM such as the FSM 701 represent one or more hand gestures such as the hand gestures 550 which are associated with one or more application functions and/or actions. As shown at 801, a grab hand gesture 550C is represented by an FSM 701A which is a sequence of two hand poses—a spread hand pose 150C and a fist hand pose 150D. The grab hand gesture 550C starts and ends with a virtual idle state such as the idle state 510 and may be associated with an application function and/or action. As shown at 802, a plurality of dock hand gestures—dock-up hand pose 550D, dock-down hand pose 550E, dock-right hand pose 550F and dock-left hand pose 550G are each represented by a respective FSM 701B, 701C, 701D and 701E. Each of the dock hand gestures starts and ends with a virtual idle state such as the idle state 510. The dock-up hand gesture 550D includes the grab hand gesture 550C followed by a move_up hand motion 350C and concluded with the spread hand pose 150C.

The dock-down hand gesture 550E includes the grab hand gesture 550C followed by a move_down hand motion 350D and concluded with the spread hand pose 150C. The dock-right hand gesture 550F includes the grab hand gesture 550C followed by a move_right hand motion 350E and concluded with the spread hand pose 150C. The dock-left hand gesture 550G includes the grab hand gesture 550C followed by a move_left hand motion 350F and concluded with the spread hand pose 150C. The association scenario presented in 802 describes several different gesture end points such as the end point 510 for each of the dock hand gestures, dock-up hand pose 550D, dock-down hand pose 550E, dock-right hand pose 550F and dock-left hand pose 550G. Each of the dock hand gestures 550D-550G may be associated with different application functions and/or actions.

During runtime execution, while monitoring the movement of the user's hand(s) detection of, for example, the dock-up gesture 550D through classification of the FSM 701B may trigger execution of the application function at the end point 510 of the associated FSM 710B. Similarly, detection of each of the other dock hand gestures, 550E, 550F and 550G may trigger the associated application function at the end point 510 of an identified FSM 710C, 701D and 701E respectively. However, as shown in the association scenario 803, it is possible that all the dock hand gestures 550D-550G is completed at a single FSM end point 510 in order to be associated with a single application function and/or action. During runtime the specific sequence of an FSM 701F which represents a dock hand gesture 550H ignores the type of hand motion following the grab hand gesture 550C as long as the move_up hand motion 350C, the move_down hand motion 350D, the move_right hand motion 350E and/or the move_left hand motion 350F are detected. Optionally, a programmer may use the move_up 350C, the move_down 350D, the move_right 350E and/or the move_left 350F hand motions data, for example, to record interaction of the user, to log the motion data for future use, to share the motion data with other one or more applications and/or to trigger other application functions (and/or actions) associated with a partial subset (sequence) of the FSM 701F representing the dock hand gesture 550H.

As is evident from the exemplary association scenarios 801, 802 and/or 803, the programmer is allowed a highly flexibility in associating one or more application functions and/or actions with any of the hand gestures 550 and may select one or more association methods as he desires, for example, a single one of the hand gestures 550, a combination of two or more of the hand gestures 550, a partial set of one or more of the hand gestures 550 and/or alternative sequences of one or more of the hand gestures 550.

Figure 9:
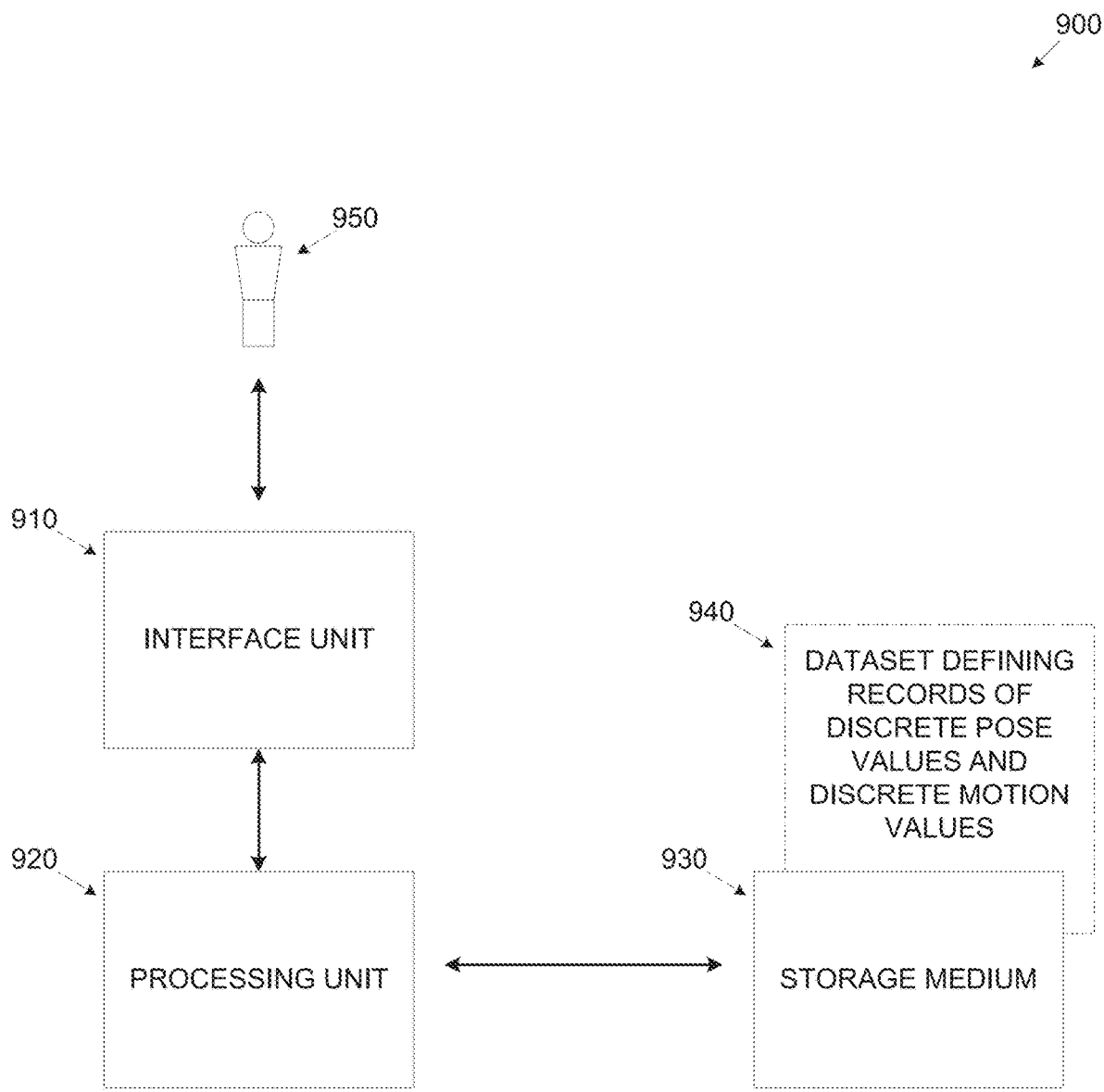
FIG. 9 is a schematic illustration of an exemplary system for defining a hand gestures API in order to associate hand(s) gestures with application functions, according to some embodiments of the present disclosure.

Reference is now made to FIG. 9 is a schematic illustration of an exemplary system for defining a hand gestures API in order to map hand gestures to application functions, according to some embodiments of the present disclosure. An exemplary system 900 includes an interface unit 910 for interacting with a programmer 950, one or more hardware processors 920 for associating one or more hand gestures such as the hand gestures 550 with one or more application functions based on code instructions provided by a programmer 950 and a storage medium 930 for storing the code instructions and a dataset with records defining discrete pose and discrete motion values 940 and/or the hand gestures 550.

Optionally, the interface unit 910 may be, for example, an integrated development environment (IDE) tool, a graphic user interface (GUI), an imaging device to capture visual directives of the programmer 950 and/or a mechanical model of a human hand which allows the programmer 950 to articulate one or more hand poses such as the hand poses 150, hand motions such as the hand motions 350 and/or hand gestures 550.

The programmer 950 creates a software application which includes one or more application functions and defines one or more hand gestures 550 which are associated with the one or more application functions. The hand gestures 550 may be represented by an FSM such as the FSM 701 are constructed of one or more of the hand poses 150 and/or hand motions 350. The one or more hand motions 550 may be pre-defined and available to the programmer 950 for association with the one or more application function and/or one or more of the hand gestures 550 may be created by the programmer 950. The processor 920 process the input received from the programmer 950 through the interface unit 910 and performs the actual association between the one or more application functions and the hand gestures 550. Association between the one or more application functions and the hand gestures 550 is done through, for example, a gestures API, a GUI, a web service and/or the like. For example, a set of pre-defined hand gestures 550 may be available to an IDE tool through a gestures library employing the gestures API so that the IDE tool may allow the programmer 950 to add API calls which link to gestures libraries at link time prior to execution on a target computerized device. The target computerized device may be, for example, a processor based device such as a laptop, a desktop, a server, a mobile device, such as a tablet, a smartphone or a wearable device including a Smartwatch or Smartglasses, computerized machine and/or any computerized appliance, for instance a home appliance.

Optionally, the gestures library and gestures API are available for run-time linking as a plugin module which may dynamically link to the software application during runtime execution on the target computerized device in real time. More, optionally, the runtime gestures plugin allows using the hand gestures 550 to initiate actions and/or the application functions of the software application without altering and/or modifying the software application. The plugin may identify one or more of the hand gestures 550 and depending on the context of the system, for example, active application, active website and/or active toolbar, the system may initiate the one or more application functions which are associated with the identified hand gestures 550.

Optionally, the programmer 950 creates one or more custom hand gestures of the hand gestures 550 to be associated with the one or more application functions. The one or more custom hand gestures may be created using the IDE tool, a custom gesture builder, a web based service and the likes.

Figure 10:
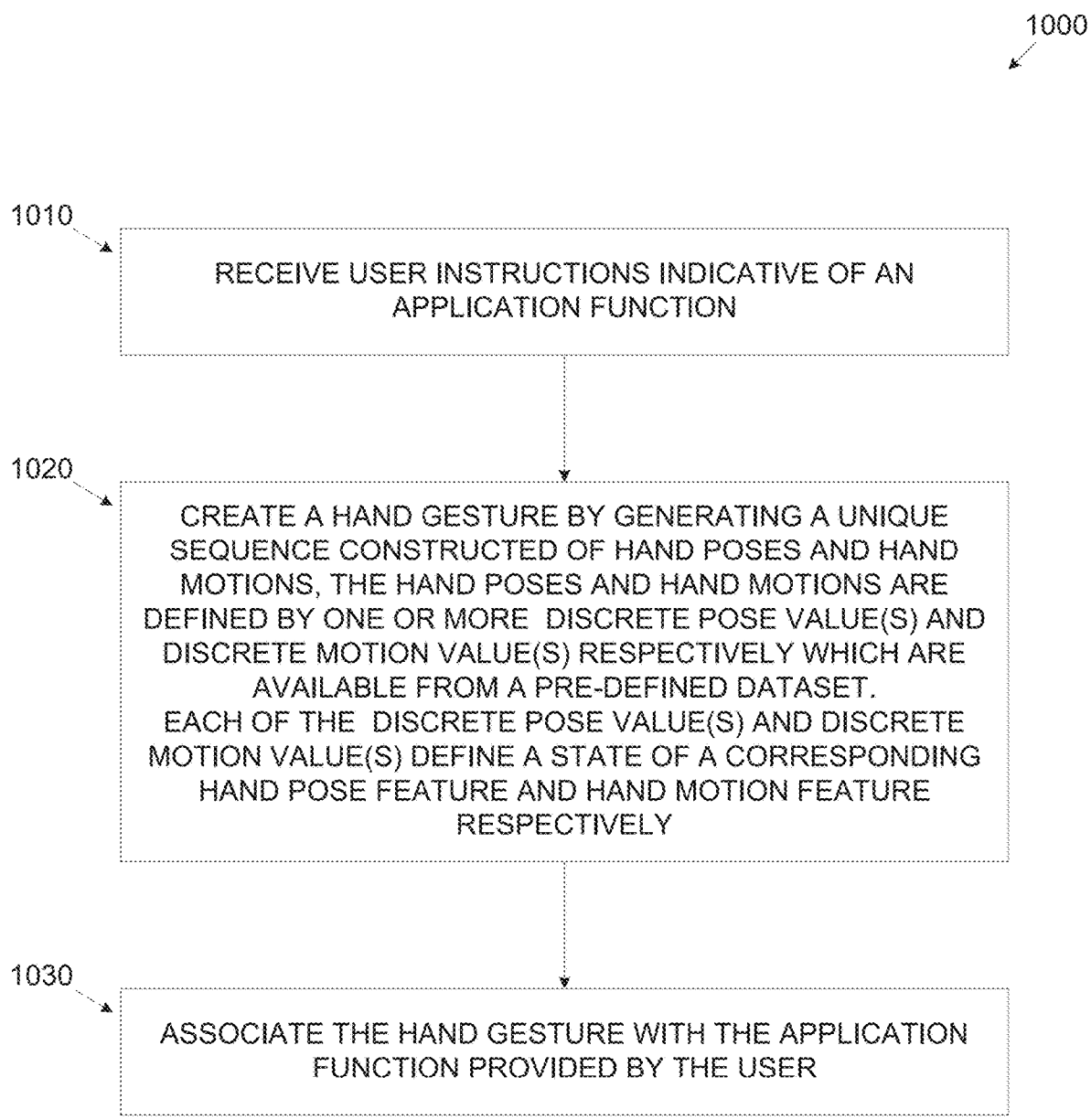
FIG. 10 is a flowchart of an exemplary process for defining a hand gestures API in order to map hand(s) gestures to application functions, according to some embodiments of the present disclosure.

Reference is now made to FIG. 10 which illustrates a flowchart of an exemplary process for defining a hand gestures API in order to associate hand(s) gestures with application functions, according to some embodiments of the present disclosure.

An exemplary process 1000 is executed in a system such as the exemplary system 900. As shown at 1020, the exemplary process 1000 starts with receiving one or more user instructions from a programmer such as the programmer 950 using for example, an IDE tool and/or a GUI for interacting with a gesture API of a gesture library. The one or more instructions indicate one or more application functions to be associated with one or more hand gestures such as the hand gestures 550. As shown at 1020 the one or more hand gestures 550 are constructed by creating a unique logic sequence such as the hand gesture sequence 501 containing one or more hand poses such as the hand poses 150 and/or hand motions such as the hand motions 350. Each of the hand poses 150 is defined by a hand pose features record such as the hand pose features record 101 and each of the hand motions 350 is defined by a hand motion features record such as the hand motion features record 301. Each of the hand pose features record 101 includes one or more discrete pose values such as the discrete pose values 111, 121, 131 and/or 141 each indicating a value of a corresponding hand pose feature such as the hand pose features 110, 120, 130 and/or 140. Each of the hand motion features record 301 includes one or more discrete motion values such as the discrete motion values 311 and 321 each indicating a value of a corresponding hand motion feature such as the hand motion features 310 and/or 320. The one or more discrete pose values 111, 121, 131 and/or 141 and/or the discrete motion values 311 and/or 321 are available from a dataset such as the dataset 940. The one or more hand gestures 550 may be created per instructions of the programmer 950 and/or may be predefined and available to the programmer 950 as pre-defined hand gestures 550 included, for example, in the dataset 940 and/or at other databases and/or libraries available in one or more storage medium devices located locally and/or at one or more remote locations. As shown at 1030, after the required one or more hand gestures 550 are created they are associated with the one or more application functions as indicated by the programmer 950. Construction and/or association of the one or more hand gestures 550 are done using the gestures library which employs the gestures API.

According to some embodiments of the present disclosure, there are provided systems and methods for providing connectivity to hand gestures functionality through a runtime plugin. The runtime plugin allows existing application to connect to a hand gesture dataset in real time, i.e. through a gestures API with no prior linkage to the gestures library. A programmer such as the programmer 950 may link a software application to one or more hand gestures such as the hand gesture 550 during runtime by dynamically linking to a runtime plugin available in an execution environment on a computerized device. The runtime plugin, for example dynamic link library (DLL) enables code and/or data sharing between application in real time thus allowing the programmer 950 to associate, using the gesture API, one or more application functions with one or more hand gestures 550 available in the DLL as one or more gestlets.

A gestlet is a hand gesture which is associated with an application function where each gestlet may be defined by three parameters—application context, associated hand gesture of the plurality of hand gestures 550 and an application function and/or action to be triggered at the detection of the associated gesture performed by a user during runtime execution of the application. The context defines which application is active at the time the gesture 550 is identified. The associated gesture defines which of the gestures 550 is selected to be associated with the each of the one or more application functions and/or actions. The application function and/or action define what needs to be performed at the detection of the associated hand gesture. Including the context into the gestlet allows two or more different applications to use one or more common and/or different gestlets. A gestlet associated with one of the application functions of a specific application may trigger the associated application function of the specific application when the specific application is the active application.

In the event the same gestlet is associated to application functions of two or more different applications, the gestlet triggers the application function of the application which is currently the active application while the other inactive application are unaffected. Optionally, no code alterations and/or modifications are required in the application in order for the runtime plugin to initiate the one or more application functions at the detection of the one or more hand gestures 550. The runtime plugin may initiate the one or more application functions using one or more interfaces already available in the application.

The application is basically unaware that the user input received through one of the application already available interface originates from the runtime plugin following identification of the one or more hand gestures 550. For example, in a certain application, a certain application function is initiated by a hotkey such as, for example, CTRL+L. An association may be done between the certain application function and a certain hand gesture of the hand gestures 550. During runtime, assuming the context identifies the application as the active application and the certain hand gesture 550 is identified the certain application function is initiated the same as if a CTRL+L hotkey is pressed. This presents a major advantage as there is no code change in the programmer's application for initiating the one or more application functions using the one or more hand gestures 550.

Figure 11:
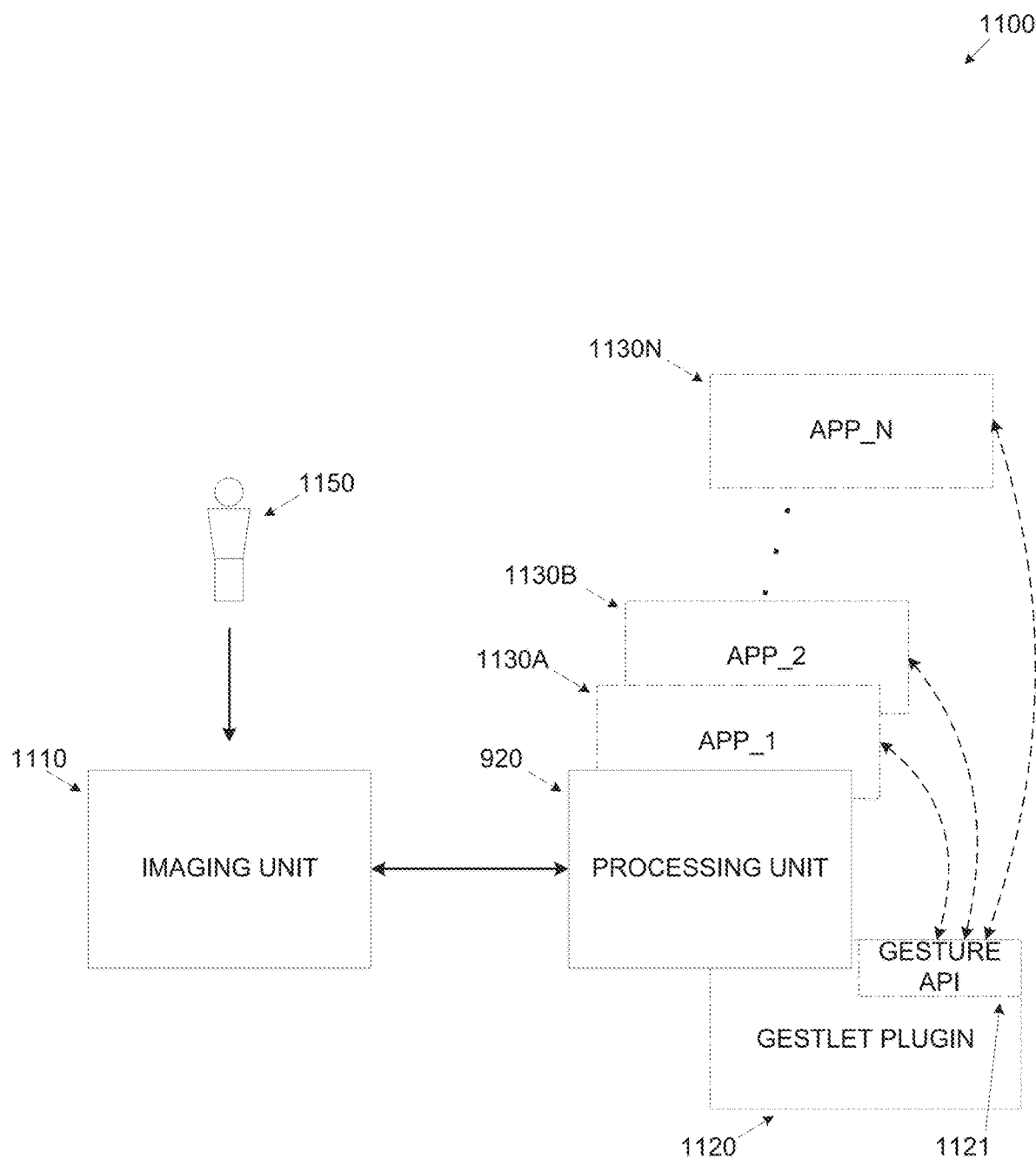
FIG. 11 is a schematic illustration of an exemplary system for associating application functions with a gestlets plugin, according to some embodiments of the present disclosure.

Reference is now made to FIG. 11 which is a schematic illustration of an exemplary system for associating application functions to a gestlets plugin, according to some embodiments of the present disclosure. A system 1100 includes a computerized device, for example, a computer, a mobile device, a computerized machine and/or a computerized appliance which includes one or more processors such as the processor 920. The processor 920 is equipped and/or attached to an imaging unit 1110, for example one or more cameras, infrared cameras, depth camera and/or stereo cameras which monitors the hand(s) movement of a user 1150. The hand(s) movement is analyzed by the processor 920 to recognize, identify and/or classify one or more hand gestures such as the hand gestures 550. The runtime execution environment of the processor 920, for example an operating system hosts one or more software applications 1130, APP_1 1130A, APP_2 1130B, through APP_N 1130N. A gestlet plugin 1120 may also be available in the runtime execution environment. One or more of the applications 1130A-1130N may dynamically connect to the gestlet plugin 1120 using a gesture API 1121 in order to associate one or more gestlets available in the gestlet plugin 1120 with one or more application functions of each of the applications 1130A-1130N.

An active application of the one or more applications 1130 at a given time may provide a context in which the gestlet plugin 1120 functions. Hand movement of the user 1150 is continuously monitored by the imaging unit 1110 and at the event of detection of the one or more hand gestures 550 which are associated with the one or more application functions of the active application from the applications 1130A-1130N, the active application is notified and the associated one or more application functions of the active application are triggered and launched. Alternatively the one or more of the hand gestures 550 are associated with one or more actions which may be triggered at the identification of the associated one or more hand gestures 550.

Optionally, the gestlet plugin 1120 uses one or more interfaces already available in the application to initiate the one or more application functions independently with no code change(s) to the application. At the event of detection of the one or more hand gestures 550 which are associated with the one or more application functions of the active application the gestlet plugin 1120 initiates the one or more associated application functions through the one or more available application interfaces, for example, keyboard input, pointing device input and/or touchscreen input.

The gestlets plugin may dramatically reduce the effort and coding or require no code change for using one or more of the hand gestures 550 to trigger the one or more application functions. In addition the gestlet library may allow one or more existing applications to connect one or more application functions to associated one or more hand gestures avoiding the need for application re-design.

Some embodiments of the present disclosure are provided through examples.

A first example may be associating a like hand gesture (thumb up) which may be implemented through one or more of the hand gestures 550 and/or through a gestlet runtime plugin such as the gestlet plugin 1120 with a like application function for a Facebook® application and/or a Facebook® web page. The association is based on context, i.e. a trigger to the like application function takes place when Facebook® is the active application and/or a web browser is the active application and the Facebook® web page is the active page. Once triggered, the like application function awards a like to a post on Facebook® which is currently the active post.

Figure 12:
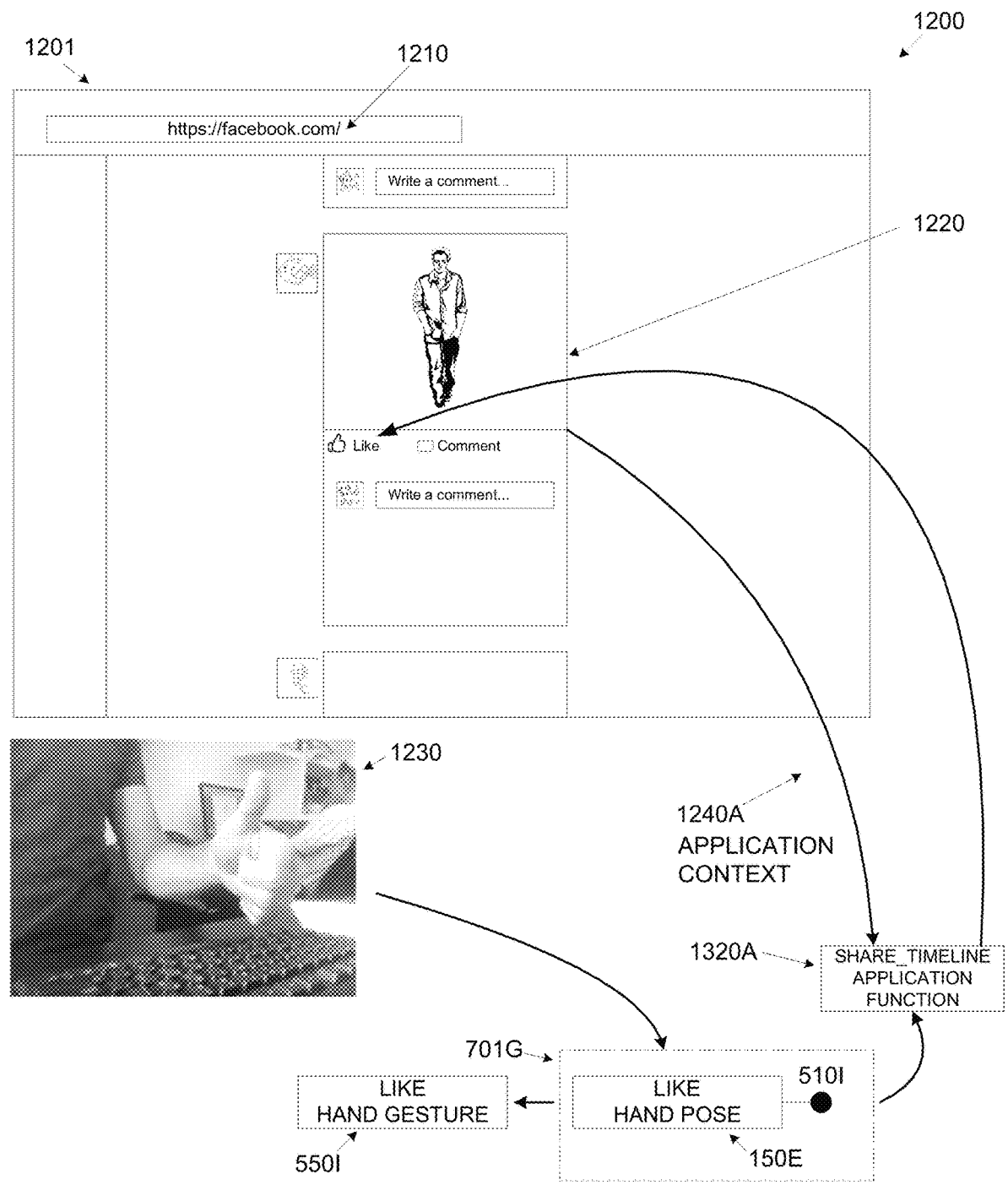
FIG. 12 is a schematic illustration of an exemplary gesture association of a like application function with an exemplary like hand gesture, according to some embodiments of the present disclosure.

Reference is now made to FIG. 12 which is a schematic illustration of an exemplary association of a like application function with an exemplary like hand gesture, according to some embodiments of the present disclosure. An illustration 1200 presents a screen snapshot 1201 of a display, for example, a laptop screen, a desktop computer display, a projector connected to a desktop, a tablet screen and/or a mobile device screen. The snapshot 1201 shows a Windows® desktop showing a web browser executed in the Windows® operating system execution environment in which a gestlet plugin such as the gestlet plugin 1120 is executed. One of the web pages open in the web browser is a Facebook® page 1210 which is currently the active page in the web browser.

An imaging device such as the imaging device 1110 is continuously monitoring a movement of hand(s) of a user such as the user 1150 and the monitored movement is processed by one or more processors such as the processor 920. A programmer such as the programmer 950 may articulate, for example, a like hand gesture as depicted by capture 1230. The articulated like hand gesture is captured by the imaging 1110 which transfers one or more captured images of the articulated like hand gesture 1230 to one or more processors such as the processor 920 for processing. The gesture plugin 1120 classifies the articulated like hand gesture 1230 as a like hand gesture 550I. The like hand gesture 550I is associated by the programmer 950 with awarding a "like" to the active post on an active Facebook® webpage. During runtime execution, an application context 1240A is available to the gestlet plugin 1120 from the operating system environment indicating the current active application is the web browser with the Facebook® page 1210 being the active page. The application context 1240A may also indicate that a post 1220 is currently the active post in on the Facebook® web page 1210.

In case an association is set between the exemplary like hand gesture 550I and a like application function 1320A of the web browser for the Facebook® web page 1210, the like application function 1320A will be triggered and a "Like" will be awarded to the active post 1220. The gestlet plugin 1120 takes advantage of the application interface available by the Facebook® web page 1210 accessed using the web browser to award a "Like" to the active post using the "L" hotkey. The gestlet plugin 1120 uses the same application interface as the keyboard hotkey "L" does to award the "Like" at the detection of the like hand gesture 550I. As shown the like hand gesture 550I is represented by an FSM 701G which is constructed of a like hand pose 150E and ended with an FSM end point 510I. The like hand pose 150E is constructed of one or more discrete pose values such as the discrete pose values 111, 121, 131 and/or 141 each indicating a value of a respective hand pose feature such as the pose features 110, 120, 130 and/or 140.

A second example may be associating a share hand gesture which may be implemented through one or more of the hand gestures 550 and/or through a gestlet runtime plugin such as the gestlet plugin 1120 with a share application function for a Facebook® application and/or a Facebook® web page. The association is based on context, i.e. a trigger to the share application function takes place when Facebook® is the active application and/or a web browser is the active application and the Facebook® web page is the active page. Once triggered, the share application function shares a post on Facebook® which is currently the active post.

Figure 13:
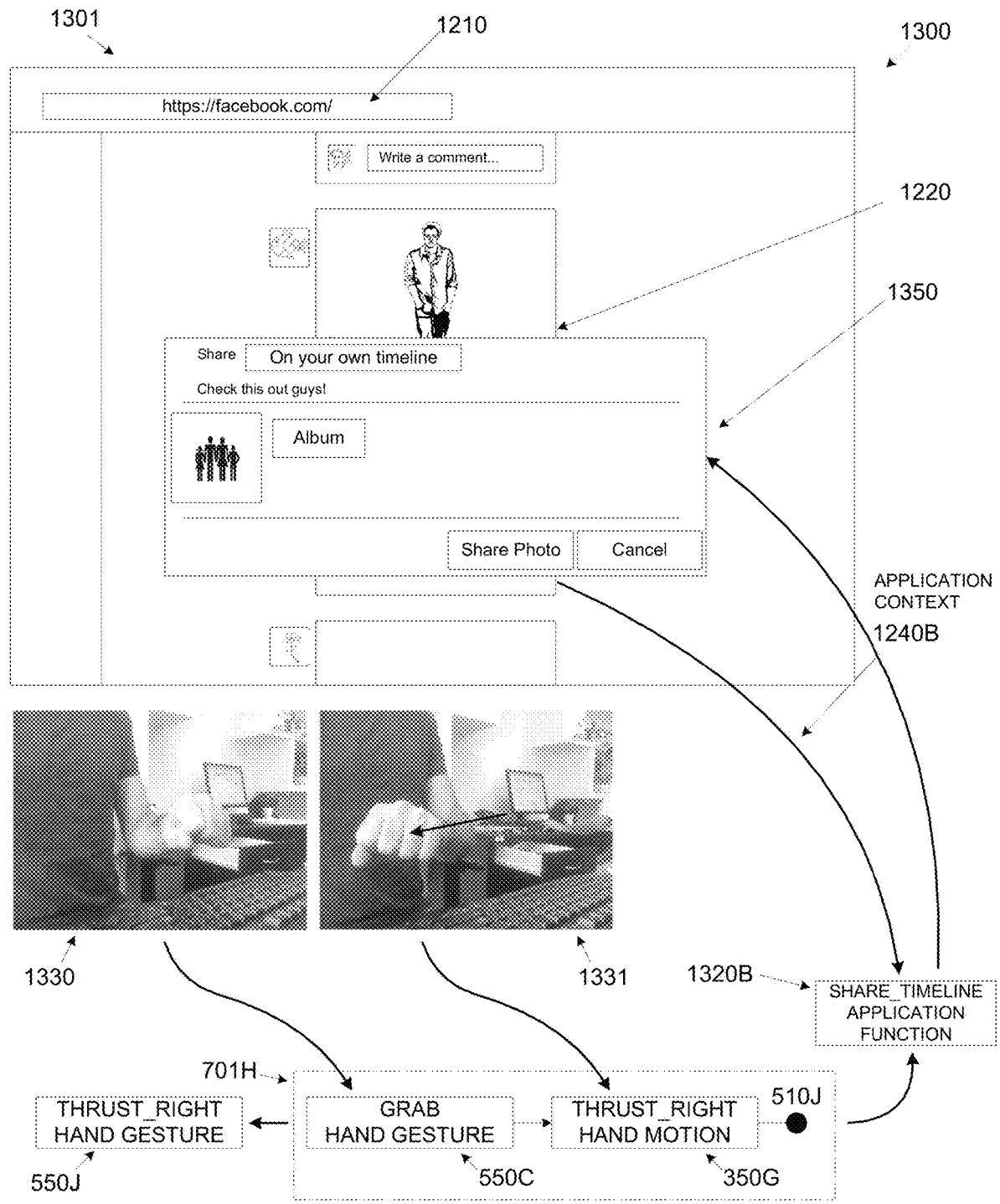
FIG. 13 is a schematic illustration of an exemplary association of a public share application function with an exemplary share hand gesture, according to some embodiments of the present disclosure.

Reference is now made to FIG. 13 which is a schematic illustration of an exemplary association of a public share application function with an exemplary share hand gesture, according to some embodiments of the present disclosure. An illustration 1300 presents a screen snapshot 1301 of a display, for example, a laptop screen, a desktop computer display, a projector connected to a desktop, a tablet screen and/or a mobile device screen. The snapshot 1301 shows a Windows® desktop showing a web browser executed in the Windows® operating system execution environment in which a gestlet plugin such as the gestlet plugin 1120 is executed. One of the web pages open in the web browser is a Facebook® page such as the Facebook® page 1210 which is currently the active page in the web browser.

An imaging device such as the imaging device 1110 is continuously monitoring a movement of hand(s) of a user such as the user 1150 and the monitored movement is processed by one or more processors such as the processor 920. A programmer such as the programmer 950 may articulate, for example, a thrust_right hand gesture as depicted by capture 1330 and 1331. The articulated thrust_right hand gesture is captured by the imaging 1110 which transfers one or more captured images of the articulated thrust_left hand gesture (as articulated by captures 1330 and 1331) to one or more processors such as the processor 920 for processing. The gesture plugin 1120 may classify the articulated thrust_left hand gesture as a public share hand gesture 550J per instructions of the programmer 950. During runtime execution, an application context 1240B is available from the operating system environment indicating the current active application is the web browser with the Facebook® page 1210 being the active page.

The application context 1240B may also indicate that a post 1220 is currently the active post in on the Facebook® web page 1210. In case an association is set between the exemplary thrust_right hand gesture 550J and a public share application function 1320B of the web browser for the Facebook® web page 1210, the public share application function 1320B is triggered by the gestlet plugin 1120 at the identification of the thrust_right hand gesture 550I done by the user 1150 and a request message 1350 is issued to request approval for sharing the post 1220 on the Facebook page 1210 timeline. As shown the thrust_right hand gesture 550J is represented by an FSM 701H which is constructed of a grab hand gesture 550C followed by a thrust_right hand motion 350G and ended with an FSM end point 510J.

Figure 14:
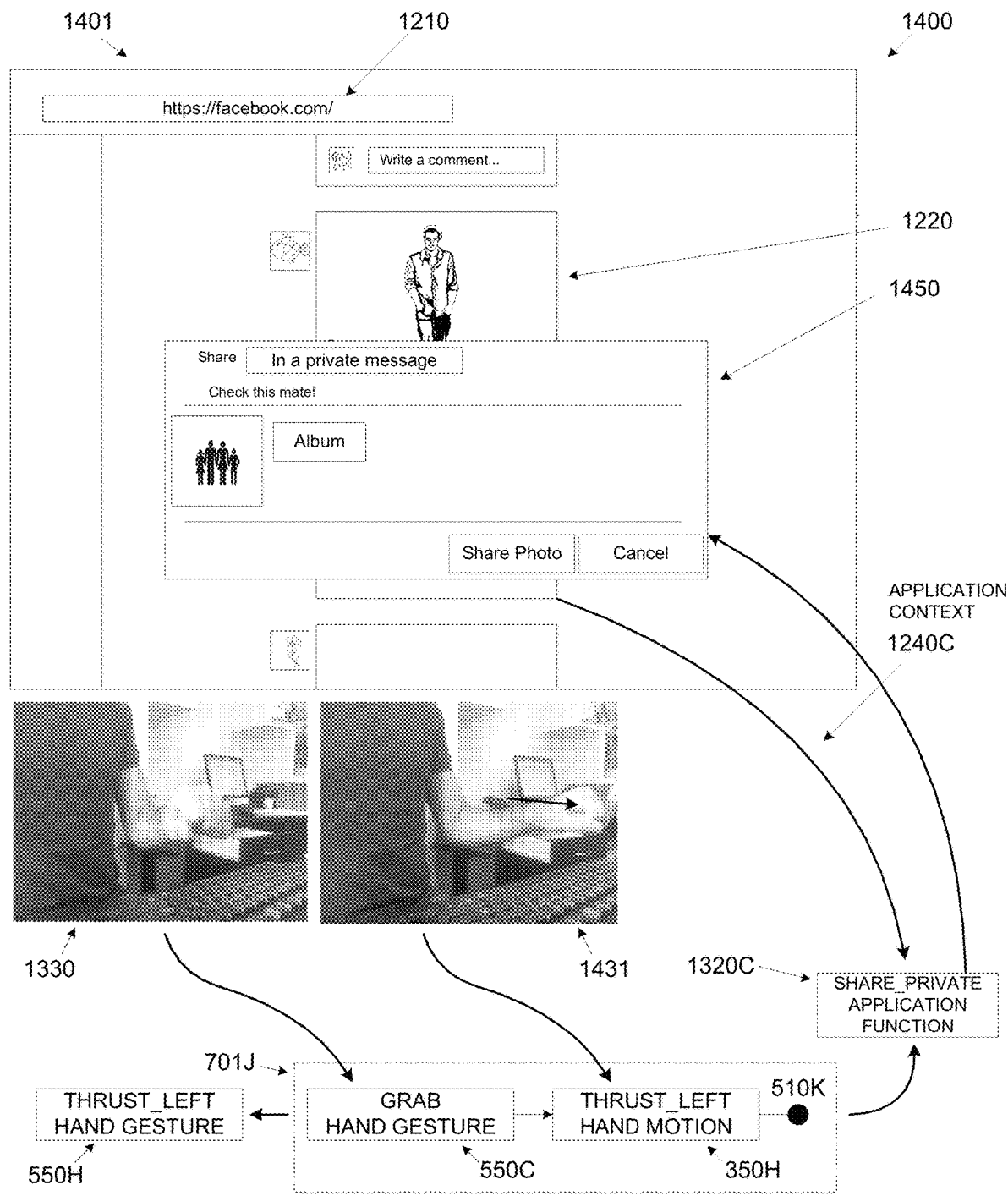
FIG. 14 which is a schematic illustration of an exemplary association of a private share application function with an exemplary share hand gesture, according to some embodiments of the present disclosure.

Reference is now made to FIG. 14 which is a schematic illustration of an exemplary association of a private share application function with an exemplary share hand gesture, according to some embodiments of the present disclosure. An illustration 1400 presents a screen snapshot 1401 of a display, for example, a laptop screen, a desktop computer display, a projector connected to a desktop, a tablet screen and/or a mobile device screen. The snapshot 1341 shows a Windows® desktop showing a web browser executed in the Windows® operating system execution environment in which a gestlet plugin such as the gestlet plugin 1120 is executed. One of the web pages open in the web browser is a Facebook® page such as the Facebook® page 1210 which is currently the active page in the web browser.

An imaging device such as the imaging device 1110 is continuously monitoring a movement of hand(s) of a user such as the user 1150 and the monitored movement is processed by one or more processors such as the processor 920. A programmer such as the programmer 950 may articulate, for example, a thrust_left hand gesture as depicted by capture 1330 and 1431. The articulated thrust_left hand gesture is captured by the imaging 1110 which transfers one or more captured images of the articulated private share hand gesture (as articulated by captures 1330 and 1431) to one or more processors such as the processor 920 for processing. The gesture plugin 1120 may classify the articulated thrust_left hand gesture as a private share hand gesture 550H per instructions of the programmer 950. During runtime execution, an application context 1240C is available from the operating system environment indicating the current active application is the web browser with the Facebook® page 1210 being the active page.

The application context 1240C may also indicate that a post 1220 is currently the active post in on the Facebook® web page 1210. In case an association is set between the exemplary thrust_left hand gesture 550H and a private share application function 1320C of the web browser for the Facebook® web page 1210, the private share application function 1320C is triggered by the gestlet plugin 1120 at the identification of the thrust_right hand gesture 550I done by the user 1150 and a request message 1450 is issued to request approval for sending the post 1220 to a Facebook contact. As shown the like hand gesture 550J is represented by an FSM 701J which is constructed of a grab hand gesture 550C followed by a thrust_right hand motion 350H and ended with an FSM end point 510K.

It is expected that during the life of a patent maturing from this application many relevant HMI and/or NMI will be developed and the scope of the term HMI and/or NMI is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "hand gesture" or "at least hand gesture" may include a single hand gesture and/or two hands gestures.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

According to some embodiments of the present disclosure there are provided systems for associating between a computerized model of hand gestures and one or more application functions. The system comprises a storage storing a plurality of hand pose features records and a plurality of hand motion features records, an interface for receiving instructions from a programmer, a memory storing a code and one or more processors coupled to the interface, the storage and the memory for executing the stored code. The code comprises code instructions to define one or more hand gestures by constructing a unique logical sequence of one or more of the hand pose features records and the plurality of hand motion features records and code instructions to associate the unique logical sequence with one or more functions of an application per the instructions for initiating execution of the one or more functions during runtime of the application and in response to detection of the unique logical sequence from analysis of a sequence of images which depict a movement of a hand of a user of the application during runtime.

Each one of the plurality of hand pose features records is defined by a unique set of discrete pose values and each one of the plurality of hand motion features records is defined by a unique set of discrete motion values. Each of the discrete pose values is indicative of a corresponding one of a plurality of hand pose features and each of the discrete motion values is indicative of a corresponding one of a plurality of hand motion features.

The hand pose feature is a member selected from a group consisting of active hand, palm direction, palm rotation, flexion of at least one finger, direction of one or more fingers, relative location between two or more fingers and/or tangency between two or more fingers.

The hand motion feature is a member selected from a group consisting of motion properties and/or motion script.

The motion script defines at least one of hand motion and/or motion of one or more fingers.

The unique sequence which represents the one or more hand gestures is defined by a unique finite state machine (FSM) model.

Optionally, the programmer defines one or more of the plurality of hand pose features and/or the plurality of hand motion features. Each of the plurality of hand pose features is associated with one or more of the discrete pose values. Each of the plurality of hand motion features is associated with one or more of the discrete motion values.

Optionally, the programmer creates one or more of the plurality of hand pose features records and/or the plurality of hand motion features records.

Optionally, the one or more hand gestures is an operation oriented gesture.

According to some embodiments of the present disclosure there is provided a computer implemented method for associating between a computerized model of hand gestures and application functions. The method employs an application code executed on one or more processors for accessing a memory storing a plurality of hand poses features records and a plurality of hand motion features records, presenting a user interface for receiving instructions from a programmer, defining one or more hand gestures by constructing a unique logical sequence of one or more of the plurality of hand pose features records and/or hand motion features records and associating the unique logical sequence with one or more functions of an application per the instructions for initiating execution of the one or more functions during runtime of the application in response to detection of the unique logical sequence from analysis of a sequence of images which depict a movement of a hand of a user of the application during runtime.

According to some embodiments of the present disclosure there is provided a software program product for associating between a computerized model of hand gestures and one or more application functions stored in a non-transitory computer readable storage medium. The software program product comprises first program instructions to access a memory storing a plurality of hand pose features records and a plurality of hand motion features records, second program instructions to present a user interface for receiving instructions from a programmer, third program instructions for defining one or more hand gesture by constructing a unique logical sequence of one or more of the plurality of hand pose features records and/or the hand motion features records and fourth program instructions for associating the unique logical sequence with one or more functions of an application per the instructions for initiating execution of the one or more functions during runtime of the application and in response to detection of the unique logical sequence from analysis of a sequence of images which depict movement of a hand of a user of the application during runtime. The first, second, third and fourth program instructions are executed by one or more computerized processors from the non-transitory computer readable storage medium.

Each one of the plurality of hand pose features records is defined by a unique set of discrete pose values and each one of the plurality of hand motion features records is defined by a unique set of discrete motion values. Each of the discrete pose values is indicative of a corresponding one of a plurality of hand pose features and each of the discrete motion values is indicative of a corresponding one of a plurality of hand motion features.

Optionally, the software program product includes fifth program instructions for enabling the programmer to define one or more of the plurality of hand pose features and/or the plurality of hand motion features. Each of the plurality of hand pose features is associated with one or more of the discrete pose values. Each of the plurality of hand motion features is associated with one or more of the discrete motion values. The fifth program instructions are executed by said at least one computerized processor from said non-transitory computer readable storage medium.

Optionally, the software program product includes fifth program instructions allowing the programmer to create one or more of the plurality of hand pose features records and/or the plurality of hand motion features records.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A system for associating between a computerized model of hand gestures and application functions, comprising:
   a storage storing a plurality of hand pose features records and a plurality of hand motion features records, each one of said plurality of hand pose features records include values for one or more of a palm pose feature, a finger flexion feature, finger tangency feature, and a finger relative location feature and each one of said plurality of hand motion features records include one or more values for a motion property feature that relate to a property of a motion;
   an interface for receiving instructions from a programmer;
   a memory storing a code;
   at least one processor coupled to said interface, said storage and said memory for executing said stored code, said code comprising:
   code instructions to define at least one hand gesture by constructing a unique logical sequence of at least one of said plurality of hand pose features records and said plurality of hand motion features records based on the values of the hand pose features and the hand motion features; and
   code instructions to associate said unique logical sequence with at least one function of an application per said instructions for initiating an execution of said at least one function during runtime of said application and in response to a detection of said unique logical sequence from an analysis of a sequence of images which depict a movement of a hand of a user of said application during said runtime.

2. The system of claim 1, wherein each of said discrete pose values is indicative of a corresponding one of a plurality of hand pose features and each of said discrete motion values is indicative of a corresponding one of a plurality of hand motion features.

3. The system of claim 1, further comprising said programmer defines at least one of: a plurality of hand pose features and a plurality of hand motion features, each of said plurality of hand pose features is associated with at least one of said discrete pose values and each of said plurality of hand motion features is associated with at least one of said discrete motion values.

4. The system of claim 1, wherein each of the one of said plurality of hand motion features records further includes one or more values for a motion script feature which defines an actual movement.

5. The system of claim 1, wherein said hand pose feature is a member selected from a group consisting of: active hand, palm direction, palm rotation, flexion of at least one finger, direction of at least one finger, relative location between at least two fingers and tangency between at least two fingers.

6. The system of claim 1, wherein said hand motion feature is a member selected from a group consisting of: motion properties and motion script, said motion script defines at least one of: hand motion and motion of at least one finger.

7. The system of claim 1, wherein each finger of a hand is assigned one of the unique set of discrete motion values.

8. The system of claim 1, wherein said unique sequence which represents said at least one hand gesture is defined by a unique finite state machine (FSM) model.

9. A computer implemented method for associating between a computerized model of hand gestures and application functions, comprising:
using an application code executed on at least one processor for:
accessing a memory storing a plurality of hand pose features records and a plurality of hand motion features records, each one of said plurality of hand pose features records include values for one or more of a palm pose feature, a finger flexion feature, finger tangency feature, and a finger relative location feature and each one of said plurality of hand motion features records include one or more values for a motion property feature that relate to a property of a motion;
presenting a user interface for receiving instructions from a programmer;
defining at least one hand gesture by constructing a unique logical sequence of at least one of said plurality of hand pose features records and said plurality of hand motion features records based on the values of the hand pose features and the hand motion features; and
associating said unique logical sequence with at least one function of an application per said instructions for initiating an execution of said at least one function during runtime of said application and in response to a detection of said unique logical sequence from an analysis of a sequence of images which depict a movement of a hand of a user of said application during said runtime.

10. The computer implemented method of claim 9, wherein each of said discrete pose values is indicative of a corresponding one of a plurality of hand pose features and each of said discrete motion values is indicative of a corresponding one of a plurality of hand motion features.

11. The computer implemented method of claim 9, further comprising said programmer defines at least one of: a plurality of hand pose features and a plurality of hand motion features, each of said plurality of hand pose features is associated with at least one of said discrete pose values and each of said plurality of hand motion features is associated with at least one of said discrete motion values.

12. The computer implemented method of claim 9, wherein said hand pose feature is a member selected from a group consisting of: active hand, palm direction, palm rotation, flexion of at least one finger, direction of at least one finger, relative location between at least two fingers and tangency between at least two fingers.

13. The computer implemented method of claim 9, wherein said hand motion feature is a member selected from a group consisting of: motion properties and motion script, said motion script defines at least one of: hand motion and motion of at least one finger.

14. The computer implemented method of claim 9, wherein said unique sequence which represents said at least one hand gesture is defined by a unique finite state machine (FSM) model.

15. A software program product for associating between a computerized model of hand gestures and application functions, comprising:
a non-transitory computer readable storage medium;
first program instructions to access a memory storing a plurality of hand pose features records and a plurality of hand motion features records, each one of said plurality of hand pose features records include values for one or more of a palm pose feature, a finger flexion feature, finger tangency feature, and a finger relative location feature and each one of said plurality of hand motion features records include one or more values for a motion property feature that relate to a property of a motion;
second program instructions to present a user interface for receiving instructions from a programmer;
third program instructions for defining at least one hand gesture by constructing a unique logical sequence of at least one of said plurality of hand pose features records and said plurality of hand motion features records based on the values of the hand pose features and the hand motion features; and
fourth program instructions for associating said unique logical sequence with at least one function of an application per said instructions for initiating an execution of said at least one function during runtime of said application and in response to a detection of said unique logical sequence from an analysis of a sequence of images which depict a movement of a hand of a user of said application during said runtime;
wherein said first, second, third and fourth program instructions are executed by at least one computerized processor from said non-transitory computer readable storage medium.

16. The software program product of claim 15, wherein each of said discrete pose values is indicative of a corresponding one of a plurality of hand pose features and each of said discrete motion values is indicative of a corresponding one of a plurality of hand motion features.

17. The software program product of claim 15, further comprising fifth program instructions for enabling said programmer to define at least one of: a plurality of hand pose features and a plurality of hand motion features, each of said plurality of hand pose features is associated with at least one of said discrete pose values and each of said plurality of hand motion features is associated with at least one of said discrete motion values, wherein said fifth program instructions are executed by said at least one computerized processor from said non-transitory' computer readable storage medium.

18. The software program product of claim 15, wherein said hand pose feature is a member selected from a group consisting of: active hand, palm direction, palm rotation, flexion of at least one finger, direction of at least one finger, relative location between at least two fingers and tangency between at least two fingers.

19. The software program product of claim 15, wherein said hand motion feature is a member selected from a group consisting of: motion properties and motion script, said motion script defines at least one of: hand motion and motion of at least one finger.

20. The software program product of claim 15, wherein said unique sequence which represents said at least one hand gesture is defined by a unique finite state machine (FSM) model.

* * * * *